United States Patent
Kim et al.

(10) Patent No.: US 9,756,130 B2
(45) Date of Patent: Sep. 5, 2017

(54) METHOD OF AND APPARATUS FOR RECONFIGURING PROTOCOL USED BY APPLICATION PROGRAM

(71) Applicant: SAMSUNG ELECTRONICS CO., LTD., Suwon-si (KR)

(72) Inventors: Tae Seok Kim, Hwaseong-si (KR); Tae Rim Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 233 days.

(21) Appl. No.: 13/627,947

(22) Filed: Sep. 26, 2012

(65) Prior Publication Data

US 2013/0091292 A1   Apr. 11, 2013

(30) Foreign Application Priority Data

Sep. 26, 2011  (KR) .................. 10-2011-0096907

(51) Int. Cl.
*H04L 29/08* (2006.01)
*H04W 4/00* (2009.01)
*H04W 4/18* (2009.01)

(52) U.S. Cl.
CPC ............ *H04L 67/12* (2013.01); *H04W 4/001* (2013.01); *H04W 4/005* (2013.01); *H04W 4/006* (2013.01); *H04W 4/18* (2013.01)

(58) Field of Classification Search
CPC ................................ H04L 67/12; H04L 67/26
(Continued)

(56) References Cited

U.S. PATENT DOCUMENTS 5,568,525 A  10/1996 de Nijs et al.
5,583,761 A * 12/1996 Chou ........................ 715/201
(Continued)

FOREIGN PATENT DOCUMENTS

CN     102098684 A   6/2011
JP       9-16495 A   1/1997
(Continued)

OTHER PUBLICATIONS

Zhang et al., "TRUMP Supporting Efficient Realization of Protocols for Cognitive Radio Networks," 2011 IEEE International Symposium on Dynamic Spectrum Access Networks (DySPAN), pp. 476-487, 2011.*

(Continued)

*Primary Examiner* — Kevin Bates
*Assistant Examiner* — Chen-Liang Huang
(74) *Attorney, Agent, or Firm* — NSIP Law

(57) ABSTRACT

A method of reconfiguring a protocol used by an application program includes determining an optimal protocol used by the application program and an optimal value of an operating parameter of the optimal protocol based on requirement information of the application program and system information obtained from a protocol layer; and when a current protocol used by the application program is not the optimal protocol, reconfiguring the current protocol used by the application program to the optimal protocol using at least one component module missing from the current protocol used by the application program and at least component module of the current protocol used by the application program, and setting a value of the operating parameter of the optimal protocol to the optimal value of the operating parameter of the optimal protocol.

20 Claims, 13 Drawing Sheets

(58) Field of Classification Search
USPC .......................................................... 709/230
See application file for complete search history.

(56) References Cited

U.S. PATENT DOCUMENTS

| | | | |
|---|---|---|---|
| 6,721,872 | B1 | 4/2004 | Dunlop et al. |
| 6,832,251 | B1* | 12/2004 | Gelvin et al. ................ 709/224 |
| 7,602,792 | B2 | 10/2009 | Gray et al. |
| 7,756,990 | B2 | 7/2010 | Hännikäinen et al. |
| 7,929,410 | B2 | 4/2011 | Hepler et al. |
| 2005/0041686 | A1 | 2/2005 | Roy et al. |
| 2005/0188367 | A1* | 8/2005 | Oberholtzer .................. 717/168 |
| 2006/0028998 | A1* | 2/2006 | Lioy ..................... H04L 69/167 370/252 |
| 2012/0054527 | A1* | 3/2012 | Pfeifer et al. ................ 713/340 |

FOREIGN PATENT DOCUMENTS

| | | |
|---|---|---|
| JP | 2001-127820 A | 5/2001 |
| JP | 2002-359623 A | 12/2002 |
| JP | 2006-186773 A | 7/2006 |
| KR | 10-0647370 B1 | 11/2006 |

OTHER PUBLICATIONS

Ergen et al., "MAC Protocol Engine for Sensor Networks," IEEE "GLOBECOM" 2009 proceedings, 2009.*

A. Faragó et al., "Meta-MAC Protocols: Automatic Combination of MAC Protocols to Optimize Performance for Unknown Conditions," *IEEE Journal on Selected Areas in Communications*, vol. 18, No. 9, Sep. 2000, pp. 1670-1681.

K. Klues et al., "A Component-Based Architecture for Power-Efficient Media Access Control in Wireless Sensor Networks," *Proceedings of the 5th International Conference on Embedded Networked Sensor Systems*, pp. 59-72; conference held Nov. 6-9, 2007, Sydney, Australia; paper presented on Nov. 7, 2007.

S.C. Ergen et al., "MAC Protocol Engine for Sensor Networks," *Proceedings of the 2009 IEEE Global Telecommunications Conference (GLOBECOM 2009)—Ad Hoc, Sensor and Mesh Networking Symposium*, pp. 1-8; conference held Nov. 30-Dec. 4, 2009, Honolulu, Hawaii; paper presented on Dec. 1, 2009.

X, Zhang et al., "TRUMP: Supporting Efficient Realization of Protocols for Cognitive Radio Networks," *Proceedings of the 2011 IEEE International Symposium on Dynamic Spectrum Access Networks (DySPAN 2011)*, pp. 476-487; conference held May 3-6, 2011, Aachen, Germany; paper presented on May 6, 2011.

T.-S. Kim et al., "Toward MAC Protocol Service over the Air," *Proceedings of the 2012 IEEE Global Communications Conference (GLOBECOM 2012)—Ad Hoc and Sensor Networking Symposium*, pp. 469-475; conference held Dec. 3-7, 2012, Anaheim, California; paper presented on Dec. 5, 2012.

Extended European Search Report issued on Feb. 5, 2013, in counterpart European Application No. 12186057.1 (7 pages, in English).

E. Patouni et al., "A Framework for Protocol Reconfiguration," *Proceedings of the 7th IFIP International Conference on Mobile and Wireless Communications Networks (MWCN 2005)*, Marrakech, Morocco, Sep. 19-21, 2005, CD published by Centry for Telecommunications Research, King's College London, London, 2005, ISBN 0-955-1814-0-2, paper present on Sep. 20, 2005 (6 pages).

K. Klues et al., "A Component-Based Architecture for Power-Efficient Media Access Control in Wireless Sensor Networks," *Proceedings of the 5th ACM Conference on Embedded Networked Sensor Systems (SenSys'07)*, Sydney, Australia, Nov. 6-9, 2007, pp. 59-72, ACM, New York, 2007, ISBN 978-1-59593-763-6, paper presented on Nov. 7, 2007 (14 pages).

J. Ansari et al., "Enabling Flexible Medium Access Design for Wireless Sensor Networks," *Proceedings of the 2011 Eighth International Conference on Wireless On-Demand Network Systems and Services (WONS 2011)*, Jan. 26-28, 2011, Bardonecchia, Italy, pp. 158-163, CD published by IEEE, 2011, ISBN 978-1-61284-188-5, paper presented on Jan. 28, 2011 (6 pages).

Y. Terashima et al., "An Implementation and Evaluation Related to Configuration Middleware Enabling Difference Update of Distributed Object Structures", *Journal of Information Processing Society of Japan*, Sep. 15, 2005, vol. 46, No. 9, pp. 2288-2299.

Japanese Office Action issued on May 10, 2016 in counterpart Japanese Application No. 2012-212796 (7 pages in Japanese with English translation).

Chinese Office Action issued on Aug. 2, 2016, in counterpart Chinese Application No. 201210364137.6. (17 pages with English translation).

Japanese Office Action issued on Oct. 11, 2016 in counterpart Japanese Application No. 2012-212796. (4 pages with English Translation).

\* cited by examiner

METHOD OF AND APPARATUS FOR RECONFIGURING PROTOCOL USED BY APPLICATION PROGRAM

CROSS-REFERENCE TO RELATED APPLICATIONS

This application claims the benefit under 35 USC 119(a) of Korean Patent Application No. 10-2011-0096907 filed on Sep. 26, 2011, in the Korean Intellectual Property Office, the entire disclosure of which is incorporated herein by reference for all purposes.

BACKGROUND

1. Field

The following description relates to a method of and an apparatus for reconfiguring a protocol used by an application program.

2. Description of Related Art

Due to widespread use of portable personal digital devices and sensors, for example, smart phones and the like, the number and variety of application programs using wireless communication are continuously increasing.

The application programs may use different qualities of service (QoS) depending on the fields they are used in. Examples of the application programs include health care programs such as electrocardiography (ECG), electroencephalography (EEG), electromyography (EMG), and the like, in a wearable body area network (BAN) field, and the like. The wearable BAN field has certain requirements, for example, a latency, a reliability (for example, a Packet Error Rate (PER)), a battery, and the like.

Also, the number of sensors connected to a personal digital device may vary in real time based on an application program that is executing in the personal digital device.

SUMMARY

In one general aspect, a method of reconfiguring a protocol used by an application program includes maintaining a memory that stores a stack of a plurality of component modules; analyzing requirement information of the application program and system information obtained from a protocol layer; determining protocol configuration information including a reconfigured protocol used by the application program and an operating parameter of the reconfigured protocol based on a result of the analyzing; and determining a connection relationship of at least one component module, among the plurality of component modules, needed to implement the reconfigured protocol based on the protocol configuration information.

The analyzing may include obtaining the requirement information of the application program based on whether an event associated with the requirement information of the application program has occurred.

The determining of the protocol configuration information may include defining a quality of service (QoS) index of each of a plurality of protocols and a QoS index corresponding to each item of the requirement information of the application program as functions of an operating parameter of the protocol and at least one parameter obtainable from the protocol layer.

The determining of the protocol configuration information may include determining the operating parameter to optimize a quality of service (QoS) index of the reconfigured protocol while satisfying requirements of the application program indicated by the requirement information of the application program.

The method may further include maintaining a protocol database that stores a plurality of protocols and respective operating parameters of the plurality of protocols mapped to requirement information by applying information including a result of the analyzing to each of the plurality of protocols; and the determining of the protocol configuration information may include referring to the protocol database to determine, as the reconfigured protocol and the operating parameter of the reconfigured protocol, one of the plurality of protocols and the operating parameter of the one protocol that are mapped to the requirement information of the application program.

The method may further include generating information associated with the connection relationship based on the protocol configuration information; and implementing the reconfigured protocol using the information associated with the connection relationship.

The method may further include maintaining a component library that stores information associated with the plurality of component modules.

The method may further include determining whether a target device in which the reconfigured protocol is to be implemented is missing any component module needed to implement the reconfigured protocol; and obtaining, from the component library, information associated with any component module determined to be missing from the target device.

The method may further include maintaining a node state database that stores information associated with a protocol and an operating parameter and of the protocol being used by a target device.

The method may further include generating information needed to implement the reconfigured protocol in a target device based on the protocol configuration information by referring to the node state database and the connection relationship; and transmitting, to the target device, the information needed to implement the reconfigured protocol in the target device.

The method may further include encoding the information needed to implement the reconfigured protocol in the target device.

The determining of the connection relationship may include receiving the protocol configuration information; and parsing the protocol configuration information.

The method may further include connecting the at least one component module using a table including an address of each of the at least one component module.

The determining of the connection relationship may include hooking a message passing to a lower layer of an application layer according to the reconfigured protocol used by the application program; and switching to the at least one component module based on an identifier (ID) of a protocol obtained from the hooked message.

In another general aspect, a non-transitory computer-readable storage medium includes a program for instructing a computer to perform the method described above.

In another general aspect, a method of reconfiguring a protocol used by an application program includes maintaining a memory that stores a stack of a plurality of component modules; receiving, from a target device, information needed to implement a reconfigured protocol used by the application program; and determining a connection relationship of at least one component module, among the plurality of component modules, needed to implement the reconfigured protocol used by the application program based on the information needed to implement the reconfigured protocol used by the application program.

The information needed to implement the reconfigured protocol used by the application program may include protocol configuration information including the reconfigured protocol used by the application program and an operating parameter of the reconfigured protocol; or information associated with the connection relationship of the at least one component module; or both the protocol configuration information and the information associated with the connection relationship.

The determining of the connection relationship may include parsing the information needed to implement the reconfigured protocol.

In another general aspect, an apparatus for reconfiguring a protocol used by an application program includes an analyzer configured to analyze requirement information of the application program and system information obtained from a protocol layer; a protocol engine configured to determine protocol configuration information including a reconfigured protocol used by the application program and an operating parameter of the reconfigured protocol based on an analysis result obtained by the analyzer; a protocol implementer configured to determine a connection relationship of at least one component, among a plurality of component modules, needed to implement the reconfigured protocol based on the protocol configuration information; and a reconfigurable protocol stack including a memory configured to store a stack of the plurality of component modules.

In another general aspect, an apparatus for reconfiguring a protocol used by an application program includes a reconfigurable protocol stack including a memory configured to store a stack of a plurality of component modules; and a protocol implementer configured to determine a connection relationship of at least one component module, among the plurality of component modules, needed to implement a reconfigured protocol used by the application program based on information needed to implement the reconfigured protocol used by the application program received from a target device.

In another general aspect, a method of reconfiguring a protocol used by an application program includes determining an optimal protocol used by the application program and an optimal value of an operating parameter of the optimal protocol based on requirement information of the application program and system information obtained from a protocol layer; and when a current protocol used by the application program is not the optimal protocol, reconfiguring the current protocol used by the application program to the optimal protocol using at least one component module missing from the current protocol used by the application program and at least component module of the current protocol used by the application program, and setting a value of the operating parameter of the optimal protocol to the optimal value of the operating parameter of the optimal protocol.

The at least one component module missing from the current protocol used by the application program and the at least component module of the current protocol used by the application program may be included in a plurality of component modules stored in a memory of a reconfigurable protocol stack.

The method may further include, when the current protocol used by the application program is the optimal protocol and a current value of the operating parameter of the optimal protocol is not the optimal value of the operating parameter of the optimal protocol, setting the value of the operating parameter of the optimal protocol to the optimal value of the operating parameter.

The application program may be running on a first device to process data transmitted to the first device using the current protocol from a second device connected to the first device; and the determining of the optimal protocol may be performed when the requirement information of the application program changes, or when a third device connects to the first device.

Other features and aspects will be apparent from the following detailed description, the drawings, and the claims.

DETAILED DESCRIPTION

Figure 1:
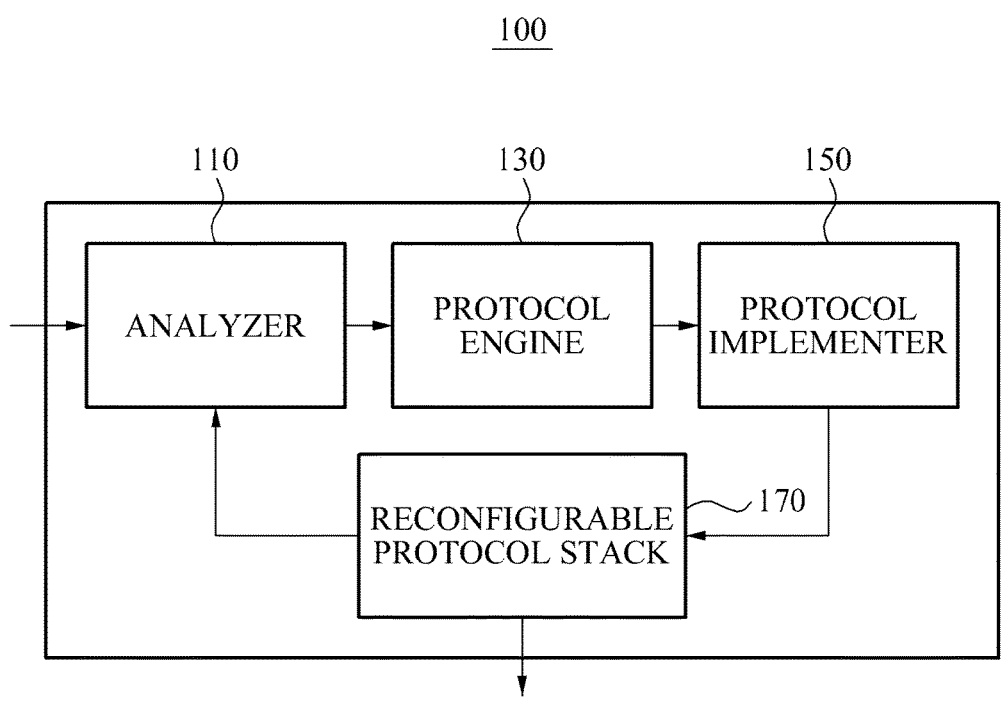
FIG. 1 is a block diagram illustrating an example of a protocol reconfiguration apparatus for reconfiguring a protocol used by an application program.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described are merely examples, and the sequences of operations are not limited to those described herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

In general, protocols may be classified into application-specific protocols and multi-purpose protocols.

An application-specific protocol designed for a particular application program may include, for example, a protocol for a sensor network such as B-MAC (Berkeley Media Access Control), X-MAC(X Media Access Control), or any other protocol for a sensor network that is known to one of ordinary skill in the art. The application-specific protocol may be designed to be optimal for a predetermined application program, but may have a significantly degraded performance for an application program that requires a different quality of service (QoS). However, installing all of the application-specific protocols that may be needed in a system may be inefficient from a memory aspect.

A multi-purpose protocol may support a variety of application programs using a profile, and may include, for example, the Institute of Electrical and Electronics Engineers (IEEE) 802.15.4 standard and any other multi-purpose protocol that is known to one of ordinary skill in the art. However, the multi-purpose protocol adds overhead to the system, so the multi-purpose protocol may not be an optimal protocol from a performance aspect.

The following examples provide a run-time architecture capable of determining an optimal protocol in real time as application programs start and terminate, and at the same time provide in real time an optimal protocol and an operating parameter capable of satisfying a QoS in an environment where an application program running on a portable digital device of a user is being dynamically used.

FIG. 1 is a block diagram illustrating an example of a protocol reconfiguration apparatus 100 for reconfiguring a protocol used by an application program. The protocol reconfiguration apparatus 100 of FIG. 1 is an apparatus that is able to actively reconfigure the protocol used by the application program.

The protocol reconfiguration apparatus 100 is capable of performing a function (1) of determining an optimal protocol for an application program or neighbor sensor nodes and reconfiguring the protocol used by the application program, and a function (2) of receiving a request from another protocol reconfiguration apparatus to reconfigure a protocol used by the protocol reconfiguration apparatus 100.

In the protocol reconfiguration apparatus 100, function (1) is performed when the protocol reconfiguration apparatus 100 operates in an active mode, and function (2) is performed when the protocol reconfiguration apparatus 100 operates in a passive mode.

The protocol reconfiguration apparatus 100 that is capable of performing functions (1) and (2) will be referred to as a full-function protocol system device (FFD).

The protocol reconfiguration apparatus 100 includes an analyzer 110, a protocol engine 130, a protocol implementer 150, and a reconfigurable protocol stack 170.

The analyzer 110 analyzes requirement information of the application program and system information that is obtained from a protocol layer. In this example, the requirement information of the application program may include QoS request information of the application program, such as a latency, a Packet Error Rate (PER), a lifetime of the application program, and any other QoS parameter known to one of ordinary skill in the art.

The system information is information that the protocol reconfiguration apparatus 100 obtains from a protocol layer, such as a physical (PHY) layer, a media access control (MAC) layer, and any other protocol layer known to one of ordinary skill in the art. Examples of the system information include a channel state, a number of devices connected to the protocol reconfiguration apparatus 100, and any other type of information known to one of ordinary skill in the art that may be obtained from a protocol layer. The devices connected to the protocol reconfiguration apparatus 100 may be, for example, sensor nodes and other digital devices.

The analyzer 110 periodically provides the requirement information and the system information obtained from the protocol layer to the protocol engine 130 in a predetermined message format.

The protocol engine 130 determines protocol configuration information that includes an optimal protocol used by the application program and an operating parameter of the optimal protocol based on the requirement information and the system information provided by the analyzer 110. The operating parameter is a parameter that the protocol reconfiguration apparatus 100 has a right to control. When a current protocol is not the optimal protocol, the optimal protocol may be considered to be a reconfigured protocol, and the operating parameter of the optimal protocol may be considered to be an operating parameter of the reconfigured protocol.

The protocol engine 130 includes an agent and a run-time solver, or an agent and a protocol database. A configuration and an operation of the protocol engine 130 will be described below with reference to FIG. 7 and FIG. 8.

The protocol implementer 150 determines a connection relationship of at least one component module, among a plurality of component modules, needed to implement the reconfigured protocol based on the protocol configuration information received from the protocol engine 130. A configuration and an operation of the protocol implementer 150 will be described below with reference to FIG. 9 and FIG. 10.

The reconfigurable protocol stack 170 maintains a memory that stores a stack of the plurality of component modules. The reconfigurable protocol stack receives information associated with the determined connection relationship, and connects the at least one component module according to the information associated with the determined connection relationship. The reconfigurable protocol stack enables functions to be componentized as component modules, and enables a needed protocol to be implemented by connecting appropriate ones of the component modules. In this example, the component modules may have trade-offs due to overhead resulting from granularity, and thus may have various configurations based on a designer's intent.

A plurality of protocols may be present in a sensor network due to characteristics of different application programs. It is a waste of time and costs to configure the optimal protocol used by each application program from the beginning. Therefore, in this example, basic functions of the protocols are componentized as component modules so the component modules may be reused in implementing different protocols.

When the protocol reconfiguration apparatus 100 that operates as the FFD operates in an active mode, the analyzer 110, the protocol engine 130, the protocol implementer 150, and the reconfigurable protocol stack 170 are all activated. When the protocol reconfiguration apparatus 100 operates in a passive mode, only the protocol implementer 150 and the reconfigurable protocol stack 170 are activated. In the passive mode, the protocol reconfiguration apparatus 100 performs the same functions as a reduced-function protocol system device (RFD) that will be described later.

Figure 2:
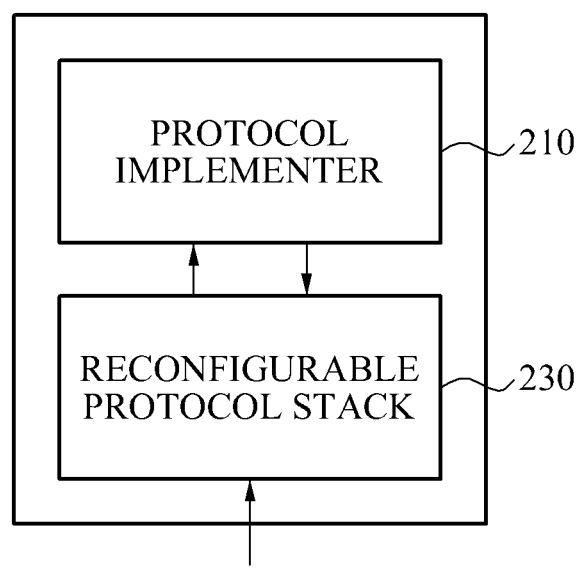
FIG. 2 is a block diagram illustrating another example of a protocol reconfiguration apparatus for reconfiguring a protocol used by an application program.

FIG. 2 is a block diagram illustrating another example of a protocol reconfiguration apparatus 200 for reconfiguring a protocol used by an application program. The protocol reconfiguration apparatus 200 is an apparatus that passively reconfigures the protocol used by the application program.

The protocol reconfiguration apparatus 200 performs only a function of implementing a reconfigured protocol in the protocol reconfiguration apparatus 200 based on information needed to implement the reconfigured protocol used by the application program received from a target device connected to the protocol reconfiguration apparatus 200.

For example, the protocol reconfiguration apparatus 200 performs only a function of receiving a request from another protocol reconfiguration apparatus to reconfigure a protocol used by the protocol reconfiguration apparatus 200, and reconfiguring the protocol according to the request. The protocol reconfiguration apparatus 200 capable of performing only the above function may be referred to reduced-function protocol system device (RFD).

The protocol reconfiguration apparatus 200 includes a protocol implementer 210 and a reconfigurable protocol stack 230.

The protocol implementer 210 determines a connection relationship of at least one component module, among a plurality of component modules, based on information needed to implement the reconfigured protocol used by the application program received from the target device. In this example, the information needed to implement the reconfigured protocol used by the application program includes information associated with the connection relationship of the at least one component module, among the plurality of component modules stored in the reconfigurable protocol stack 230, that is needed to implement the reconfigured protocol.

The target device may be the protocol reconfiguration apparatus 100 that has the capability of actively reconfiguring the protocol used by the application program, or may be a device that has a function similar to the function of the protocol reconfiguration apparatus 100.

Information needed to implement the reconfigured protocol used by the application program includes protocol configuration information including the reconfigured protocol used by the application program and an operating parameter of the reconfigured protocol, and information associated with the connection relationship.

The reconfigurable protocol stack 230 includes a memory that stores a stack of the plurality of component modules. An operation of the reconfigurable protocol stack 230 is the same as the reconfigurable protocol stack 170 of FIG. 1, and accordingly a description thereof will be not be repeated here for conciseness.

Figure 3:
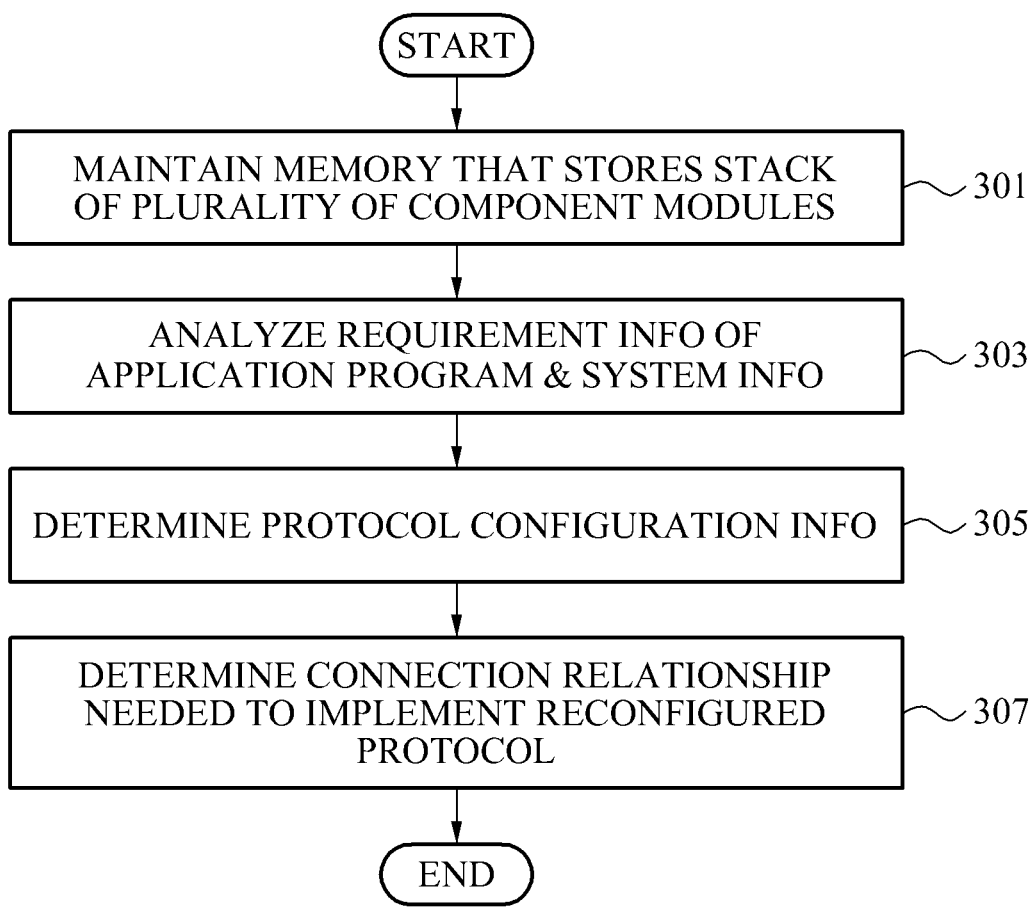
FIG. 3 is a flowchart illustrating an example of a method of reconfiguring a protocol used by an application program in the protocol reconfiguration apparatus of FIG. 1.

FIG. 3 is a flowchart illustrating an example of a method of reconfiguring a protocol used by an application program in the protocol reconfiguration apparatus 100 of FIG. 1. In 301, the protocol reconfiguration apparatus 100 maintains a memory that stores a stack of a plurality of component modules.

In 303, the protocol reconfiguration apparatus 100 analyzes requirement information of the application program and system information obtained from a protocol layer.

As an example, in 303, the protocol reconfiguration apparatus 100 obtains the requirement information of the application program based on whether an event, such as an association, associated with the requirement information of the application program has occurred.

In 305, the protocol reconfiguration apparatus 100 determines protocol configuration information based on a result of the analysis. The protocol configuration information includes a reconfigured protocol used by the application program and an operating parameter of the reconfigured protocol. The protocol reconfiguration apparatus 100 determines the protocol configuration information using, for example, a run-time solver or a protocol database.

Hereinafter, an example of a method in which the protocol reconfiguration apparatus 100 determines the protocol configuration information using the run-time solver will be described.

In this example, the protocol reconfiguration apparatus 100 defines at least one QoS index of each of a plurality of protocols and least one QoS index corresponding to the requirement information of the application program as functions of system parameters that are obtainable from the protocol layer, parameters obtained from the analyzer 110, and operating parameters of the protocols that the protocol configuration apparatus 100 has a right to control. The protocol reconfiguration apparatus 100 determines operating parameters that both optimize the at least one QoS index of the reconfigured protocol and satisfy the requirements of the application program indicated by the at least one QoS index corresponding to the requirement information of the application program.

Hereinafter, an example of a method in which the protocol reconfiguration apparatus determines the protocol configuration information using the protocol database will be described.

In this example, the protocol reconfiguration apparatus 100 maintains a protocol database. The protocol database stores optimal protocols and operating parameters for the optimal protocols that are determined by applying, to each of the protocols, information including the analysis result of the analyzer 110, and the operating parameters of the protocols. By referring to the protocol database, the protocol reconfiguration apparatus 100 determines, as the reconfigured protocol and the operating parameter for the reconfigured protocol, an optimal protocol and an operating parameter for the optimal protocol that are mapped to the requirement information of the application program in the protocol database.

The methods of determining protocol configuration information using the run-time solver and the protocol database will be described in greater detail later with reference to FIG. 7 and FIG. 8.

In 307, the protocol reconfiguration apparatus 100 determines a connection relationship of at least one component module, among the plurality of component modules, needed to implement the reconfigured protocol based on the protocol configuration information.

An operation of the protocol reconfiguration apparatus 100 varies depending on whether the protocol reconfiguration apparatus 100 desires to reconfigure a protocol used by the protocol reconfiguration apparatus 100, or to reconfigure a protocol used by a target device connected to the protocol reconfiguration apparatus 100. The varying operation of the protocol reconfiguration apparatus 100 depending on a target protocol to be reconfigured will be described later with reference to FIG. 9 through FIG. 11.

Figure 4:
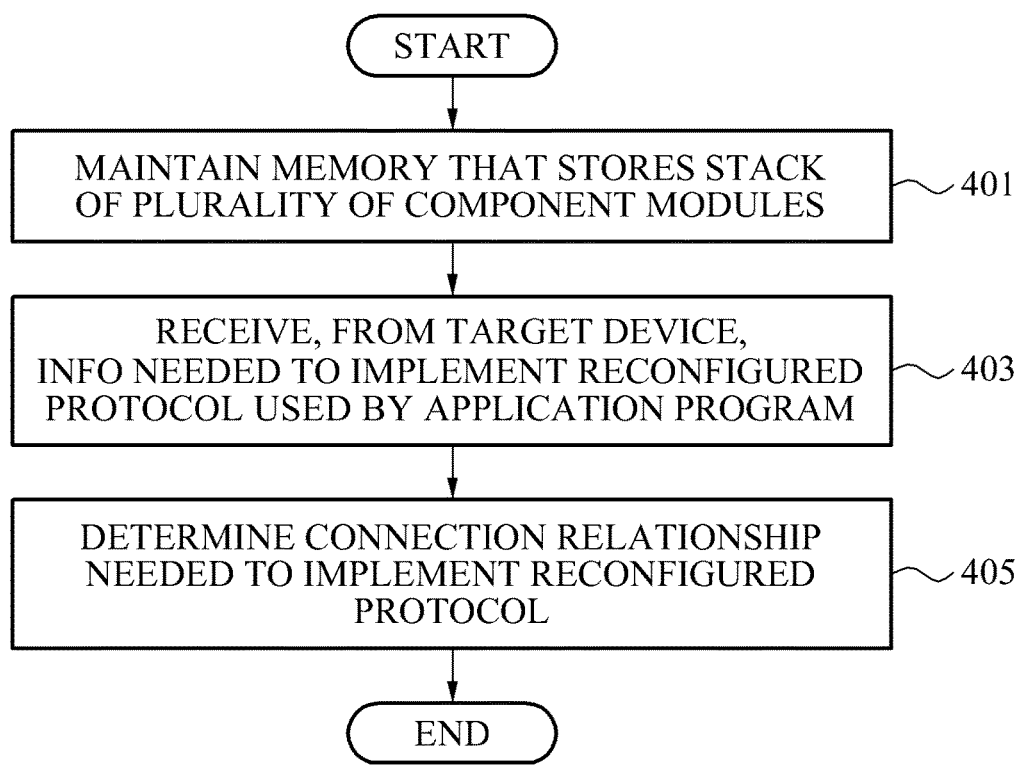
FIG. 4 is a flowchart illustrating an example of a method of reconfiguring a protocol used by an application program in the protocol reconfiguration apparatus of FIG. 2.

FIG. 4 is a flowchart illustrating another example of a method of reconfiguring a protocol used by an application program in the protocol reconfiguration apparatus 200 of FIG. 2. In 401, the protocol reconfiguration apparatus 200 maintains a memory that stores a stack of a plurality of component modules.

In 403, the protocol reconfiguration apparatus 200 receives, from a target device connected to the protocol reconfiguration apparatus 200, information needed to implement a reconfigured protocol used by the application program.

In this example, the information needed to implement the reconfigured protocol used by the application program includes protocol configuration information including the reconfigured protocol used by the application program and an operating parameter of the reconfigured protocol, or information associated with a connection relationship of at least one component module, among the plurality of component modules, needed to implement the reconfigured protocol, or both the protocol configuration information and the information associated with the connection relationship. The information needed to implement the reconfigured protocol used by the application program may be encoded.

When the protocol reconfiguration apparatus 200 receives the information needed to implement the reconfigured protocol used by the application program, the protocol reconfiguration apparatus 200 parses and uses the information.

In 405, the protocol reconfiguration apparatus 200 determines the connection relationship of at least one component module, among the plurality of component modules, needed to implement the reconfigured protocol based on the information needed to implement the reconfigured protocol.

Figure 5:
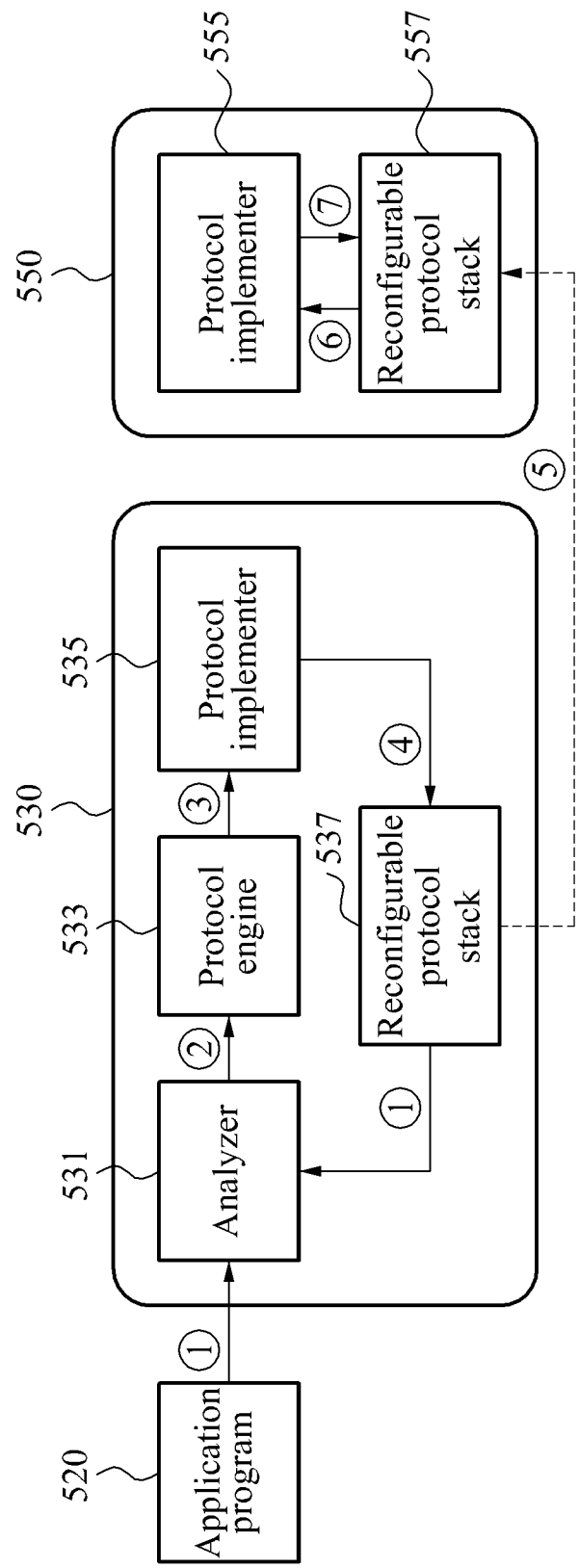
FIG. 5 is a block diagram illustrating an example of an operation between protocol reconfiguration apparatuses in a protocol reconfiguration system including the protocol reconfiguration apparatuses.

FIG. 5 is a block diagram illustrating an example of an operation between protocol reconfiguration apparatuses in a protocol reconfiguration system including the protocol reconfiguration apparatuses. Referring to FIG. 5, the protocol reconfiguration system includes a protocol reconfiguration apparatus 530 that is an FFD operating in an active mode, and a target device 550 that is an RFD. In FIG. 5, ①, ②, ③, ④, ⑤, ⑥, and ⑦ denote a sequence of message transfers between elements of the protocol reconfiguration apparatus 530 and the target device 550.

The protocol reconfiguration apparatus 530 includes an analyzer 531, a protocol engine 533, a protocol implementer 535, and a reconfigurable protocol stack 537. The target device 550 includes a protocol implementer 555 and a reconfigurable protocol stack 557.

The analyzer 531 obtains requirement information of an application program 520 from the application program 520 (①), and obtains system information from a protocol layer of the reconfigurable protocol stack 537 (①). In this example, the application program 520 may be installed in the protocol reconfiguration apparatus 530, or in the target device 550. The application 520 may process data from a sensor connected to the target device 550.

The analyzer 531 analyzes the obtained information and provides an analysis result to the protocol engine 533 (②).

The protocol engine 533 determines protocol configuration information based on the analysis result of the analyzer 531. The protocol configuration information includes a reconfigured protocol used by the application program 520 and an operating parameter of the reconfigured protocol. The protocol engine 533 provides the protocol configuration information to the protocol implementer 535 (③).

To implement the reconfigured protocol based on the protocol configuration information, the protocol implementer 535 determines a connection relationship of at least one component module, among a plurality of component modules stored in the reconfigurable protocol stack 537, needed to implement the reconfigured protocol.

The reconfigurable protocol stack 537 maintains a memory that stores a stack of the plurality of component modules.

The protocol implementer 535 transmits information associated with the connection relationship to the reconfigurable protocol stack 537 (④). The reconfigurable protocol stack 537 connects the at least one component module based on the received information to implement the reconfigured protocol.

The reconfigurable protocol stack 537 transmits information needed to implement the reconfigured protocol used by the application program to the target device 550, i.e., the RFD connected to the protocol reconfiguration apparatus 530 (⑤).

The reconfigurable protocol stack 557 of the target device 550 receives, from the reconfigurable protocol stack 537 of the protocol reconfiguration apparatus 530, information needed to implement the reconfigured protocol, and transmits the received information to the protocol implementer 555 of the target device 550 (⑥).

The protocol implementer 555 determines a connection relationship of at least one component module, among the plurality of component modules, based on the information needed to implement the reconfigured protocol used by the application program, and transmits information associated with the connection relationship to the reconfigurable protocol stack 557 of the target device 550 (⑦).

The reconfigurable protocol stack 557 implements the reconfigured protocol in the target device 550 by connecting at least one component module, that is among the plurality of component modules, needed to implement the reconfigured protocol based on the information associated with the connection relationship.

Figure 6:
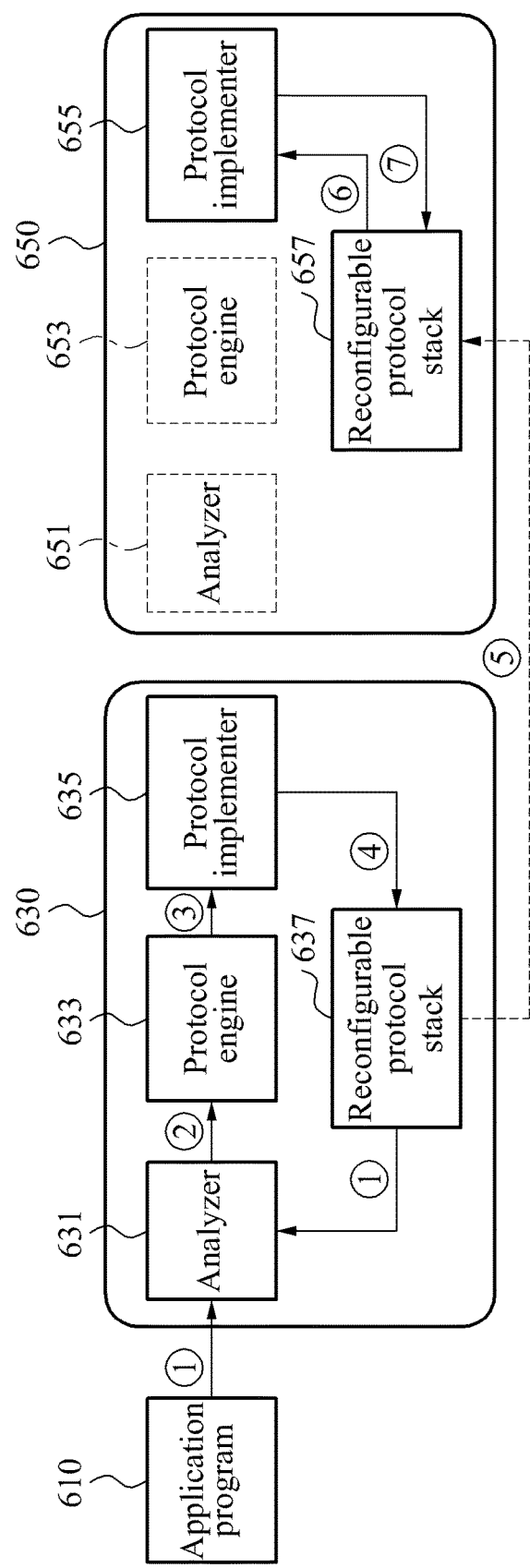
FIG. 6 is a block diagram illustrating another example of an operation between protocol reconfiguration apparatuses in a protocol reconfiguration system including the protocol reconfiguration apparatuses.

FIG. 6 is a block diagram illustrating another example of an operation between protocol reconfiguration apparatuses in a protocol reconfiguration system including the protocol reconfiguration apparatuses. Referring to FIG. 6, the protocol reconfiguration system includes a protocol reconfiguration apparatus 630, for example, an FFD, operating in an active mode, and a target device 650, for example, an FFD, operating in a passive mode.

The protocol reconfiguration apparatus 630 includes an analyzer 631, a protocol engine 633, a protocol implementer 635, and a reconfigurable protocol stack 637. The target device 650 includes a protocol implementer 655 and a reconfigurable protocol stack 657.

The operation of the protocol reconfiguration apparatus 630 operating in the active mode is the same as the operation of the protocol reconfiguration apparatus 530 of FIG. 5. Also, the operations of the protocol implementer 655 and the reconfigurable protocol engine 657 of the protocol reconfiguration apparatus 650 operating in the passive mode are the same as the operations of the protocol implementer 555 and the reconfigurable protocol engine 557 of the target device 550 of FIG. 5, and the functions of the analyzer 651 and the protocol engine 653 are inactivated. Thus, the protocol reconfiguration apparatus 650 operating in the passive mode operates functionally the same as the RFD that is the target device 550 of FIG. 5. Accordingly, the descriptions of the operations of the elements in FIG. 5 are also applicable to the elements in FIG. 6, and therefore will be not repeated here for conciseness.

Figure 7:
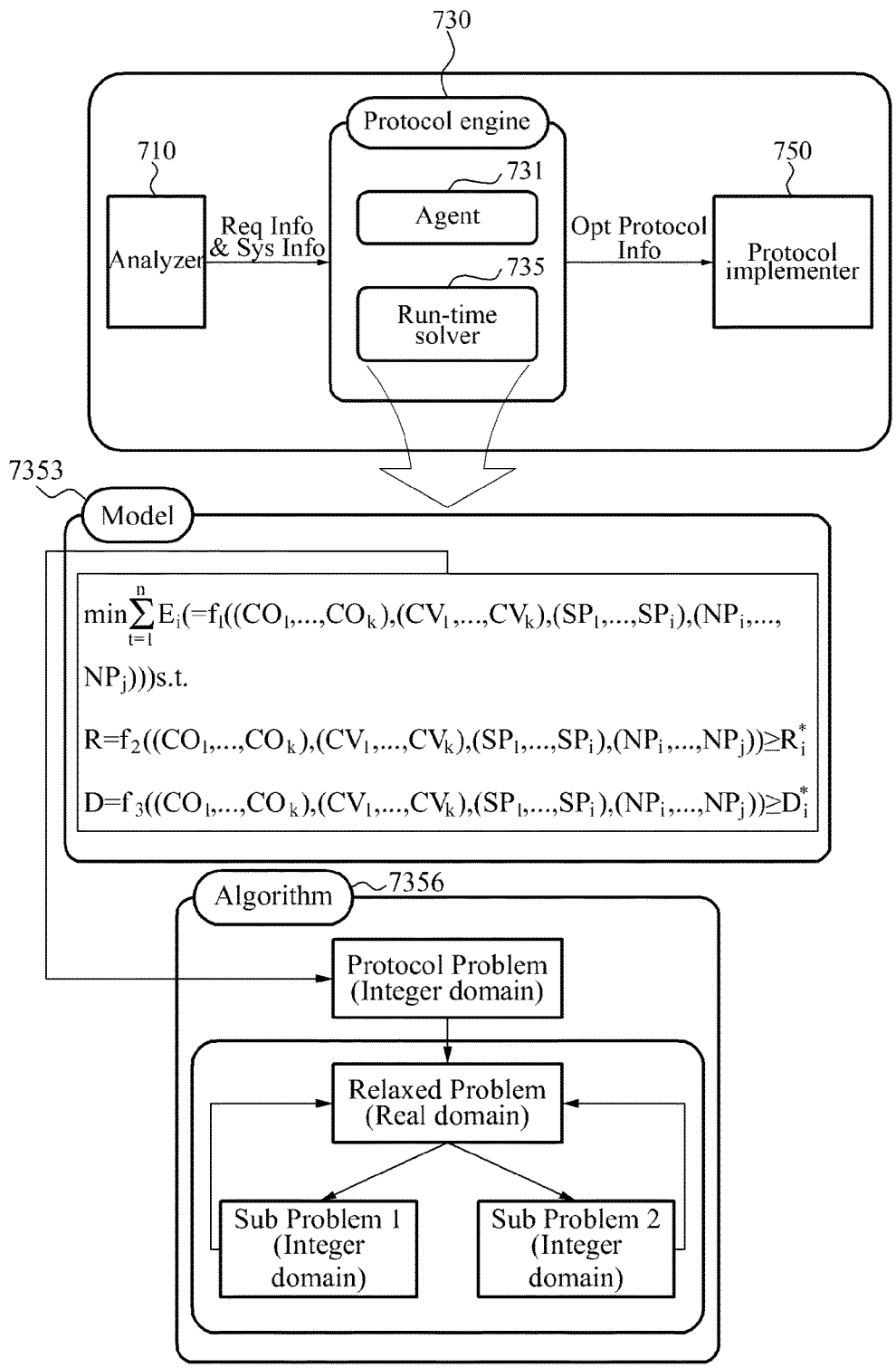
FIG. 7 is a diagram illustrating an example of a method of implementing a protocol engine using a run-time solver.

FIG. 7 is a diagram illustrating an example of a method of implementing a protocol engine 730 using a run-time solver 735. Referring to FIG. 7, the protocol engine 730 includes an agent 731 and the run-time solver 735.

The agent 731 receives from an analyzer 710 requirement information of an application and system information that are an analysis result of the analyzer 710, and triggers the run-time solver 735 periodically based on the information. The agent 731 transfers an operation result of the run-time solver 735 to a protocol implementer 750.

The run-time solver 735 determines in real time an optimal protocol used by an application program, which may be considered to be a reconfigured protocol used by the application program if the current protocol is not the optimal protocol, and determines an operating parameter of the optimal protocol. The run-time solver 735 determines the reconfigured protocol used by the application program, at least one component module needed to implement the reconfigured protocol, and an operating parameter of the reconfigured protocol.

The protocol engine 730 implemented using the run-time solver 735 includes a modeling unit 7353 and an algorithm unit 7356.

The modeling unit 7353 defines at least one QoS index of each of a plurality of protocols and at least one QoS index corresponding to the requirement information of the application program as functions of parameters that are obtainable from a protocol layer, parameters obtained from the analyzer 710, and operating parameters of the protocols that a protocol configuration apparatus including the protocol engine 730 and the protocol implementer 750 in FIG. 7 has a right to control.

In this example, it will be assumed that the requirement information of the application program includes requirements of a reliability and a delay or latency, and that a user desires to minimize an energy used by the application program. Thus, in this example, the energy used by the application program is a QoS index of each of the plurality of protocols, and the reliability and the delay or latency are QoS indices corresponding to the requirement information of the application program.

In this example, the modeling unit 7353 formulates an optimization problem for energy minimization using the defined functions of the QoS indices based on the requirement information of the application program.

In one example of the modeling unit 7353, at least one QoS index of each of a plurality of protocols and at least one QoS index corresponding to the requirement information of the application program are formulated as functions of system information, for example, $SP_1, \ldots, SP_i$, network information, for example, $NP_1, \ldots, NP_j$, at least one component module, for example, $CO_1, \ldots, CO_k$, of a reconfigurable protocol stack (not shown), and operating parameters, for example, $CV_1, \ldots, CV_k$, of the reconfigured protocol that are obtained from at least one component module needed to implement the reconfigured protocol. Network information relates to values that may dynamically vary based on an external environment, not values that a protocol intrinsically has. For example, a channel environment (packet transmission success rate) is one example of network information, and this information may be obtained by monitoring a packet reception rate in a radio card. In this example, the QoS indices may include, for example, energy $(E_i)$, reliability $(R_i)$, delay (latency) $(D_i)$, and any other QoS indices known to one of ordinary skill in the art. Thus, in this example, the energy $(E_i)$ is a QoS index of each of the plurality of protocols, and the reliability $(R_i)$ and the delay (latency) $(D_i)$ are QoS indices corresponding to the requirement information of the application program.

Through the aforementioned operation, the protocol engine 730 optimizes the at least one QoS according to a purpose of the application program.

The protocol engine 730 obtains, from the analyzer 710, requirement information of the application program, system information, and network information, and then inputs the information into equations for the QoS indices defined by the modeling unit 7353.

The protocol engine 730 determines an operating parameter that optimizes the at least one QoS index of the reconfigured protocol within a range in which requirements of the application program indicated by the at least one QoS index corresponding to the requirement information of the application program are satisfied. This process is performed by the algorithm unit 7356. The algorithm unit 7356 selects or develops a suitable algorithm based on the optimization problem formulated by the modeling unit 7353, and implements the algorithm in the protocol reconfiguration apparatus. The algorithm unit 7356 may employ a branch and bound algorithm, which is a general algorithm for finding optimal solutions of optimization problems in integer programming, based on the assumption that the operating parameters of the protocols have integer values.

In simplified terms, what the algorithm unit 7356 does is to find a combination of optimal values of operating parameters for each available protocol (or a value of a single operating parameter if there is only one operating parameter) that has a best QoS index, such as a lowest energy, for that protocol, and that also satisfies the requirements indicated by the least one QoS index corresponding to the requirement information of the application program. Then, the algorithm unit 7356 selects the protocol that has the best QoS index, such as a lowest energy, among all of the available protocols. The selected protocol is the optimal protocol, and the operating parameters for the selected protocol are the operating parameters for the optimal protocol.

Figure 8:
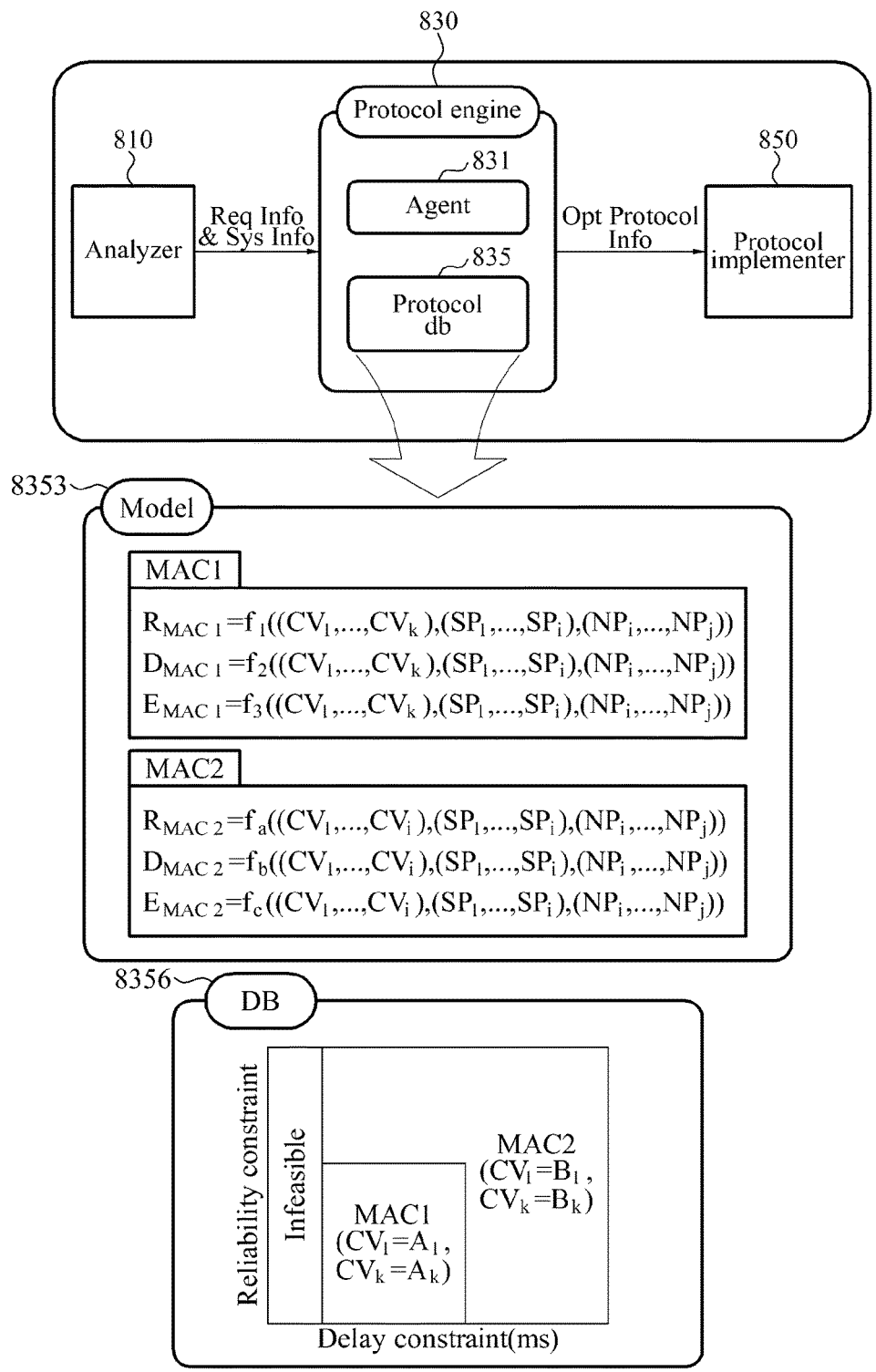
FIG. 8 is a diagram illustrating an example of a method of implementing a protocol engine using a protocol database.

FIG. 8 is a diagram illustrating an example of a method of implementing a protocol engine 830 using a protocol database 835. Even though the protocol engine 830 is implemented using the protocol database 835, an agent 831 of the protocol engine 830 may function the same as the agent 731 of the protocol engine 730 in FIG. 7.

For example, the agent 831 receives information obtained by an analyzer 810, and triggers an operation of the protocol database 835 periodically based on the information. The agent 831 transfers a determination result of the protocol database 835 to a protocol implementer 850.

In this example, when using the protocol database 835, instead of using the algorithm unit 7356 in FIG. 7 to determine an optimal protocol and operating parameters for the optimal protocol as needed, a modeling unit 8353 uses an algorithm to compute in advance an optimal protocol for external parameters and operating parameters for the optimal protocol, and stores the results in a database 8356. The external parameters may include, for example, requirement information of an application program obtainable offline, system information, network information, and any other parameter known to one of ordinary skill in the art that affects the optimal protocol.

By referring to the protocol database 835, the protocol engine 830 receiving the information obtained by the analyzer 810, for example, the requirement information of the application program, determines the optimal protocol an operating parameter for the optimal protocol that are mapped to the requirement information of the application program in the database 8356.

The protocol engine 830 transits the result of the determination by the protocol database 835 to the protocol implementer 850 as the reconfigured protocol and the operating parameter of the reconfigured protocol.

In simplified terms, the data that is stored in the protocol database is indexed by values of the parameters of the requirement information of the application program, such as reliability and delay (or latency), and includes the optimal protocol for each possible combination of the values of the parameters of the requirement information within ranges covered by the protocol database, and optimal values of operating parameters for the optimal protocol. The optimal protocol for each combination of the values of the parameters of the requirement information is the protocol that has a best QoS index, such as a lowest energy, among all of the available protocols. The optimal values of the operating parameters for the optimal protocol are the values of the operating parameters for the optimal protocol that have a best QoS index, such as a lowest energy, for the optimal protocol, and that also satisfy the requirements indicated by the requirement information.

The database 8356 in FIG. 8 shows an example in which the database 8356 is indexed by values of reliability and delay (or latency) as parameters of the requirement information of the application program. For values of delay below a first value, there is no protocol that can satisfy any combination of values of reliability and delay (the region labeled "Infeasible" in the FIG. 8). For values of delay between the first value and a second value, and values of reliability below a first value, the optimal protocol is MAC1, and the operating parameters for the optimal protocol are $A_1$ through $A_k$. For values of delay between the second value and a maximum value, and values of reliability between the first value and a maximum value, the optimal protocol is MAC2, and the operating parameters for the optimal protocol are $B_1$ through $B_k$.

Implementing the protocol engine 830 using the protocol database 835 may be effective when a computing capability of the protocol reconfiguration apparatus is insufficient to operate the run-time solver 735 in FIG. 7. In addition, implementing the protocol engine 830 using the protocol database 850 may be effective when a wide operation range of the reconfigured protocol or the operating parameter is not needed due to a relatively static and simple environment.

Figure 9:
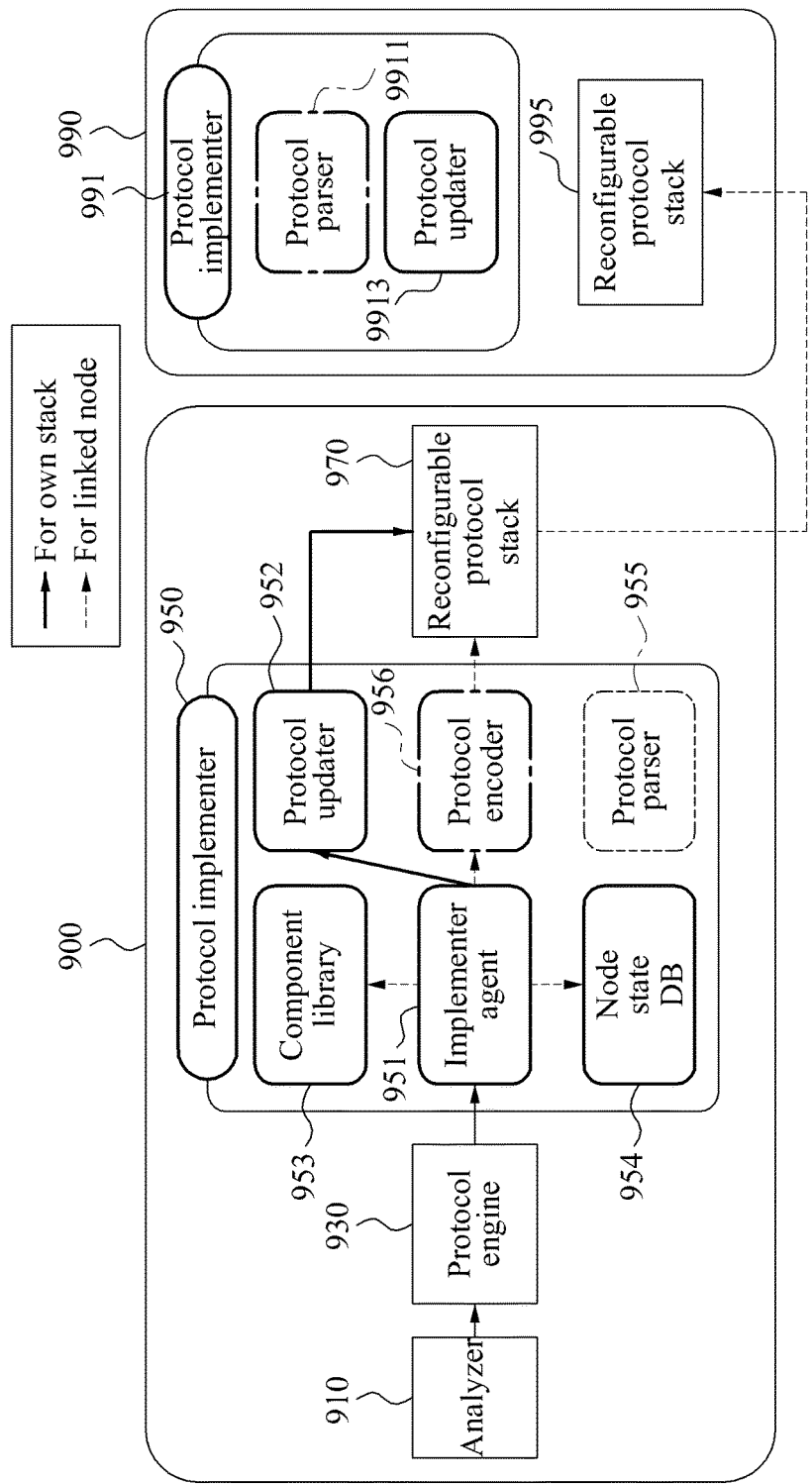
FIG. 9 is a block diagram illustrating an example of a configuration of a protocol implementer that operates in an active mode in a protocol reconfiguration apparatus.
Figure 10:
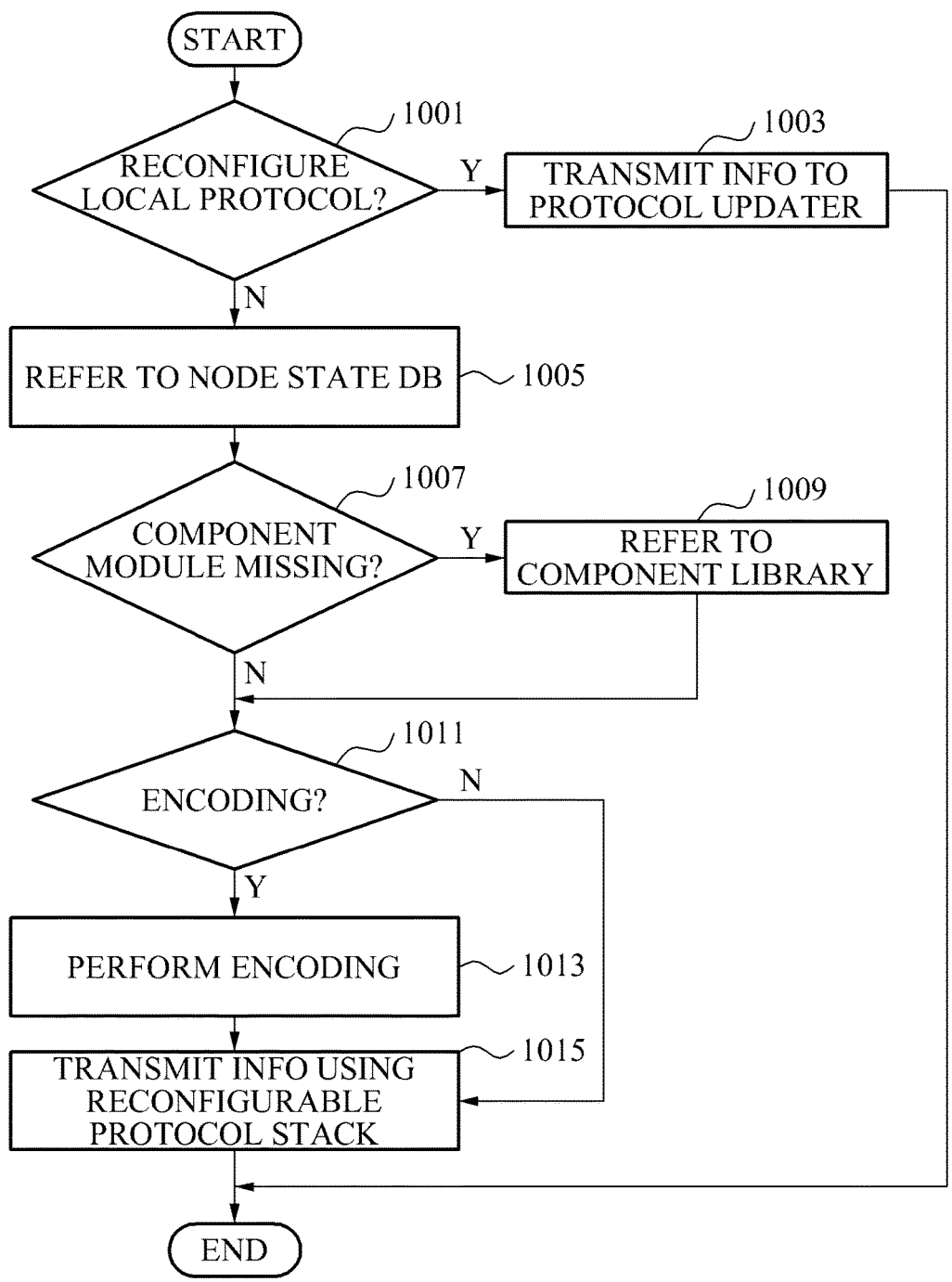
FIG. 10 is a flowchart illustrating an example of a method of operating the protocol implementer of FIG. 9 in the active mode.

FIG. 9 is a block diagram illustrating an example of a configuration of a protocol implementer 950 that operates in an active mode in a protocol reconfiguration apparatus 900, and FIG. 10 is a flowchart illustrating an example of a method of operating the protocol implementer 950 of FIG. 9 in the active mode.

The protocol implementer 950 parses protocol configuration information that is received from a protocol engine 930, and enables a reconfigured protocol to be implemented in a protocol layer based on the protocol configuration information.

The protocol engine 930 determines the protocol configuration information based on information that the protocol engine receives from an analyzer 910.

For example, to implement the reconfigured protocol based on the protocol configuration information, the protocol implementer 950 determines a connection relationship of at least one component module, among a plurality of component modules stored in a reconfigurable protocol stack 970, needed to implement the reconfigured protocol.

The protocol implementer 950 performs different operations based on a function of the protocol reconfiguration apparatus 900. For example, constituent elements of the protocol implementer 950 and operations thereof are different in a case where the protocol reconfiguration apparatus 900 operates as an FFD, and in a case where the protocol reconfiguration apparatus 900 operates as an RFD.

FIG. 9 shows a protocol reconfiguration apparatus 900 that operates as the FFD and a protocol reconfiguration apparatus 990 that operates as the RFD. In this example, the protocol reconfiguration apparatus 990 performs a function of a target device that is connected to the protocol reconfiguration apparatus 900.

When the protocol reconfiguration apparatus 900 desires to reconfigure a protocol used by the protocol reconfiguration apparatus 900, the protocol implementer 950 generates information associated with a connection relationship of at least one component module, among the plurality of component modules stored in the reconfigurable protocol stack 970, needed to implement the reconfigured protocol based on protocol configuration information and uses the information associated with the connection relationship to implement the reconfigured protocol.

In this example, the information associated with the connection relationship includes a protocol identifier (ID), component information, and an operating parameter value. When the protocol reconfiguration apparatus 900 does have a component module needed to implement the reconfigured protocol, the information associated with the connection relationship further includes an ELF (Executable and Linkable Format) formatted code of the needed component module.

The protocol implementer 950 of the protocol reconfiguration apparatus 900 includes an implementer agent 951, a protocol updater 952, a component library 953, and a node state database 954. The protocol implementer 950 may further include a protocol parser 955 and a protocol encoder 956.

The protocol parser 955 is not used when the protocol reconfiguration apparatus 900 operates as the FFD.

The protocol encoder 956 is used only when encoding information, for example, information associated with the connection relationship, to be transmitted to the reconfigurable protocol stack 970.

The implementer agent 951 generates information needed to implement the reconfigured protocol in the target device, i.e., the protocol reconfiguration apparatus 990, based on protocol configuration information received from the protocol engine 930.

An operation of when the implementer agent 951 generates information needed to implement the reconfigured protocol corresponds to 1001 and 1003 in FIG. 10.

In 1001, the implementer agent 951 determines whether to reconfigure a local protocol, i.e., a protocol used by the protocol reconfiguration apparatus 900 in which the implementer agent 951 is located.

When it is determined in 1001 to reconfigure the local protocol, i.e., the protocol used by the protocol reconfiguration apparatus 900, the implementer agent 951 transmits relevant information, for example, information associated with a connection relationship of at least one component module needed to implement the reconfigured protocol, to the protocol updater 952 in 1003. In this example, the information associated with the connection relationship includes a protocol ID, component information associated with at least one component module needed to implement the reconfigured protocol, and an operating parameter value for the reconfigured protocol.

When the reconfigurable protocol stack 970 is missing a component module needed to implement the reconfigured protocol, the implementer agent 951 also transmits code of missing component module to the protocol updater 952. The code of the missing component module may be formatted, for example, in an ELF format.

The protocol updater 952 implements the reconfigured protocol using the information associated with the connection relationship that was transmitted in 1003.

The solid lines in FIG. 9, indicate a message flow when the protocol implementer 950 reconfigures the protocol used by the protocol reconfiguration apparatus 900.

On the contrary, when it is determined in 1001 not to reconfigure the local protocol, i.e., the protocol used the protocol reconfiguration apparatus 900, the implementer agent 951 refers to the node state database 951 in 1005 to begin a process of implementing the reconfigured protocol in the protocol reconfiguration apparatus 990 as the target device.

The implementer agent 951 maintains the node state database 954 that stores information associated with a protocol being used by the target device, i.e., the protocol reconfiguration apparatus 990, an operating parameter of the protocol being used by the target device, and protocols available in the target device.

By referring to the node state database 954, the implementer agent 951 generates information needed to implement the reconfigured protocol in the target device based on the protocol configuration information. The implementer agent 951 transmits the generated information to the target device, for example, i.e., the protocol reconfiguration apparatus 990, using the reconfigurable protocol stack 970.

In 1007, by referring to the node state database 954, the implementer agent 951 determines whether the target device is missing a component module needed to implement the reconfigured protocol.

When it is determined in 1007 that the target device is missing a component module, the implementer agent 951 refers to the component library 953 in 1009. The component library 953 stores information associated with a plurality of component modules that are used to implement a plurality of protocols. By referring to the component library 953, the implementer agent 951 obtains information associated with the missing component module needed to implement the reconfigured protocol, and stores the obtained information in a memory. The information associated with the missing component module may be formatted, for example, an ELF format.

In this example, contents of information to be transmitted to the target device, for example, information needed to implement the reconfigured protocol, may be confirmed.

In 1011, the agent 951 determines whether encoding of the corresponding information is to be performed to increase the robustness of information to be transmitted to the target device based on information provided by a user indicating that encoding is to be performed.

When it is determined in 1011 that encoding is to be performed, the implementer agent 951 performs encoding of the information to be transmitted to the target device using the protocol encoder 956 in 1013.

On the contrary, when it is determined in 1011 that encoding is not to be performed, the implementer agent 951 skips the encoding in 1013 and wirelessly transmits the information to be transmitted to the target device using the reconfigurable protocol stack 970 in 1015 without encoding the information.

In 1015, the implementer agent 951 also wirelessly transmits the encoded information using the reconfigurable protocol stack 970 if the encoding was performed in 1013.

The dashed lines in FIG. 9 indicate a message flow when the protocol implementer 950 generates information needed to implement the reconfigured protocol in the target device, i.e., the protocol reconfiguration apparatus 990.

The protocol reconfiguration apparatus 990 that operates as the RFD includes a protocol implementer 991 and a reconfigurable protocol stack 995.

The protocol implementer 991 includes a protocol parser 9911 to parse information and a protocol updater 9913 to execute the parsed information.

A configuration and an operation of the protocol implementer 991 of the protocol reconfiguration apparatus 990 that operates as the RFD are the same as a protocol implementer of a protocol reconfiguration apparatus that operates as the FFD operating in a passive mode. Hereinafter, an operation of the protocol implementer 991 of the protocol reconfiguration apparatus 990 that operates as the RFD will be described with reference to FIG.

Figure 11:
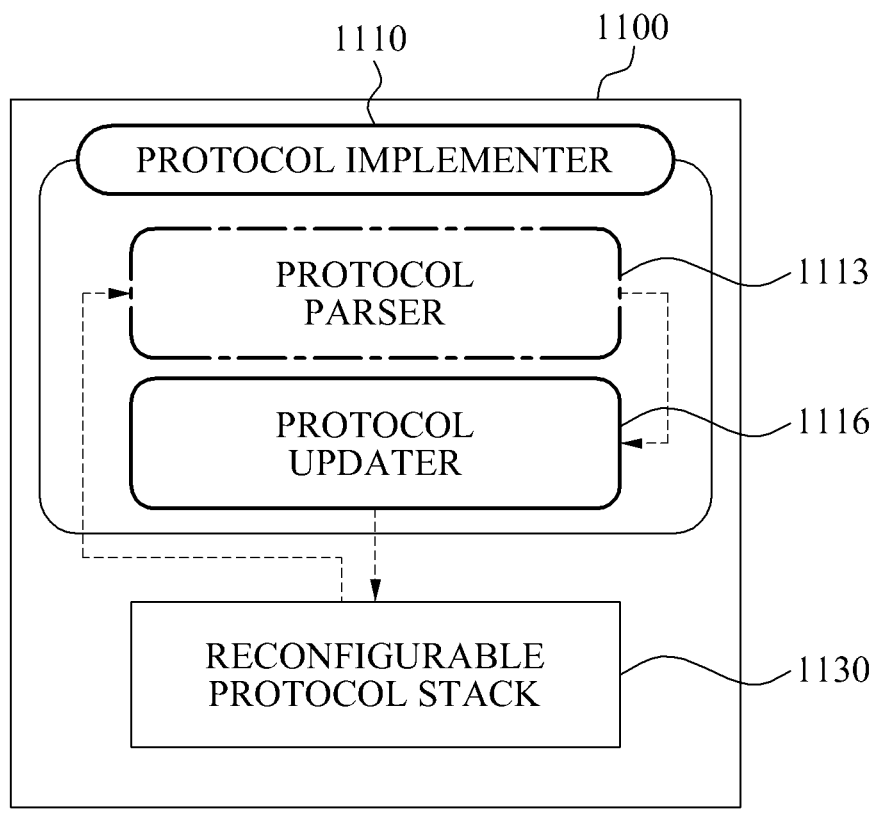
FIG. 11 is a block diagram illustrating an example of operating a protocol implementer when a protocol reconfiguration apparatus operates as a reduced-function protocol system device (RFD).

FIG. 11 is a block diagram illustrating an operation of a protocol implementer 1110 when an protocol reconfiguration apparatus 1100 operates as an RFD. The protocol implementer 1110 includes a protocol parser 1113 and a protocol updater 1116. The protocol parser 1113 operates only when a protocol reconfiguration apparatus that operates as an FFD has encoded information using a protocol encoder and transmitted the encoded information to the protocol reconfiguration apparatus 1100.

Information that is received by the protocol reconfiguration apparatus 1100 from the protocol reconfiguration apparatus functioning as the FFD is transferred to the protocol parser 1113 using a reconfigurable protocol stack 1130. In this example, the received information is information needed to implement a reconfigured protocol used by an application program in the protocol reconfiguration apparatus 1100. The protocol parser 1113 parses the corresponding information and transmits the parsed information to the protocol updater 1116.

The protocol updater 1116 determines a connection relationship of at least one component module, among a plurality of component modules, needed to implement the reconfigured protocol in the protocol reconfiguration apparatus 1100 based on the parsed information.

The protocol updater 1116 transmits information associated with the connection relationship to the reconfigurable protocol stack 1130 to connect at least one component module based on the information associated with the connection relationship. In this example, the information transmitted from the protocol updater 1116 to the reconfigurable protocol stack 1130 to implement the reconfigured protocol may vary depending on how the reconfigurable protocol stack 1130 has been implemented.

Figure 12:
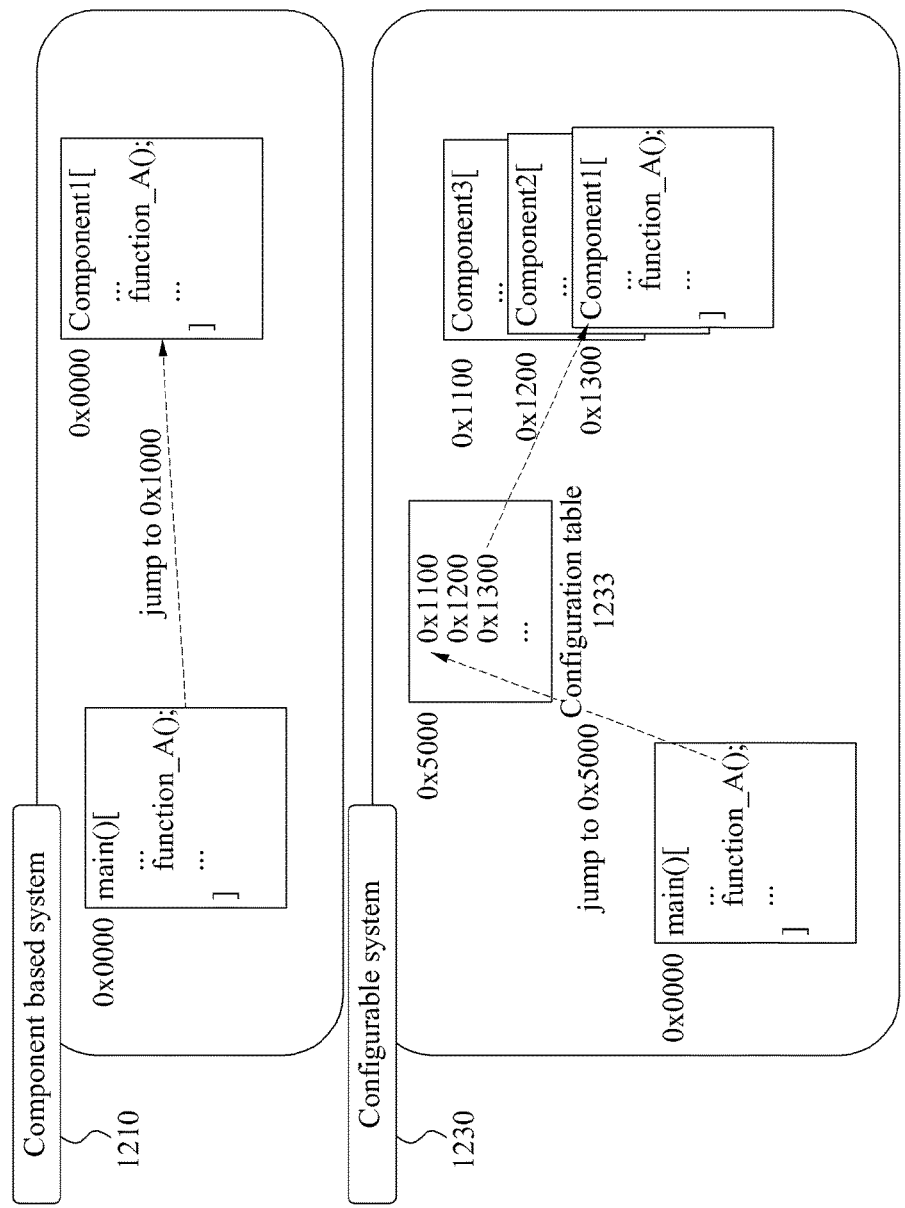
FIG. 12 is a diagram illustrating an example of a method in which a protocol implementer implements a reconfigured protocol using a configuration table.

FIG. 12 is a diagram illustrating a method in which a protocol implementer implements a reconfigured protocol using a configuration table 1233. The upper diagram 1210 shows a general component module structure, and the lower diagram 1230 shows the reconfigured protocol that has been reconfigured using the configuration table 1233.

In the lower diagram 1230, the protocol implementer implements the reconfigured protocol in real time by connecting at least one component module using the configuration table 1233.

In this example, the configuration table 1233 includes an address of each of at least one component module needed to implement the reconfigured protocol. Also, the configuration table 1233 includes a routing function of enabling the at least component module to be accessible. Therefore, even though a plurality of functions that call a corresponding component module and have the same name are present in a plurality of protocols, the configuration table 1233 may directly access an address of the needed component module. Also, in this example, a protocol updater informs a reconfigurable protocol stack of an ID of the needed component module, for example, ID=1, 2, or 3, corresponding to Component1, Component2, or Component3 as shown in FIG. 12.

Figure 13:
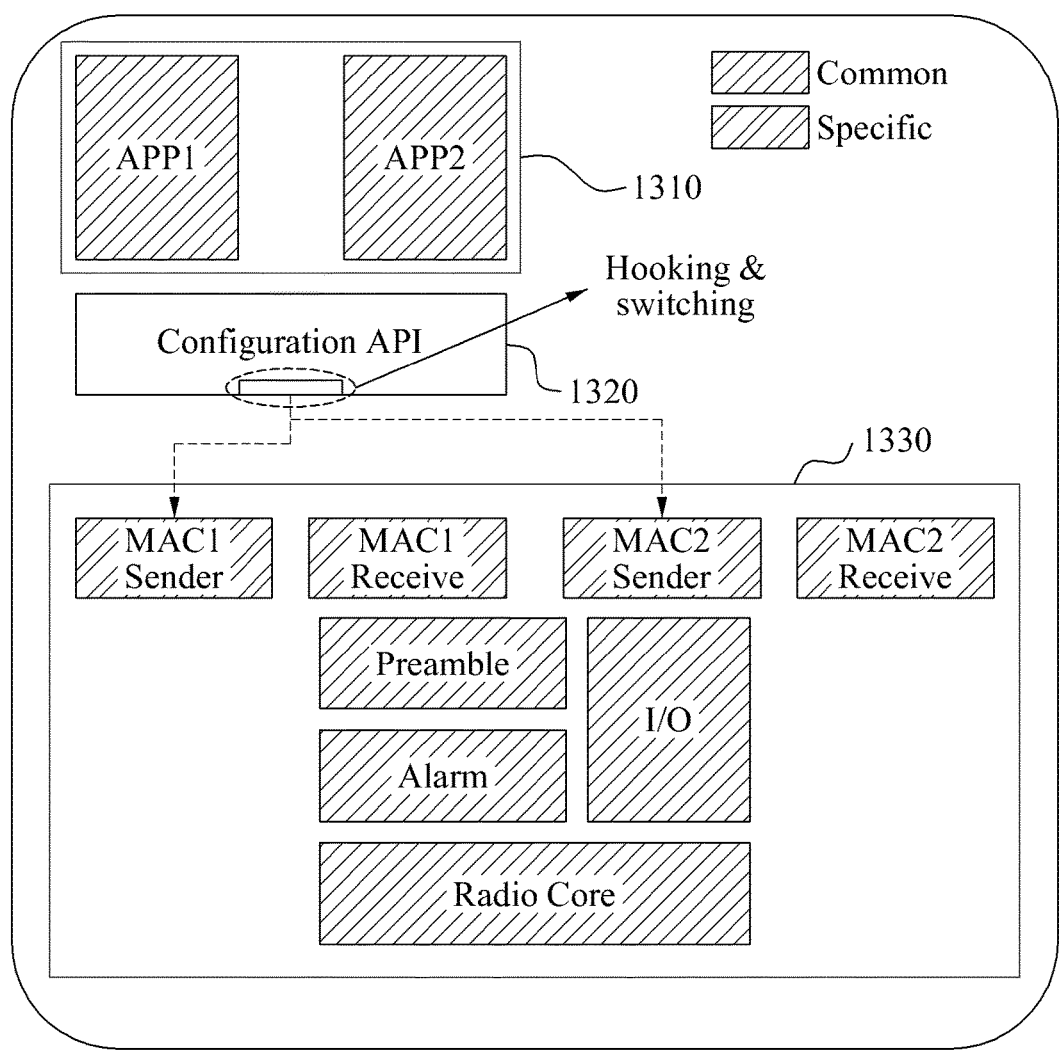
FIG. 13 is a diagram illustrating an example of a method in which a protocol implementer implements a reconfigured protocol using message hooking.

FIG. 13 is diagram illustrating a method in which a protocol implementer implements a reconfigured protocol using message hooking. As shown in FIG. 13, a configuration layer (API) 1320 is positioned below an application layer 1310 (APP1 and APP2).

In this example, the protocol implementer obtains an ID of a protocol by hooking a message being sent to a lower MAC layer 1330 using the configuration layer 1320. The protocol implementer switches at least one component module needed to implement the reconfigured protocol based on the ID of the protocol. A protocol updater informs a reconfigurable protocol stack of a protocol ID corresponding to the reconfigured protocol.

Hereinafter, an operation of a protocol reconfiguration system when a number of RFDs connected to a single FFD dynamically changes from '1' to '3' will be described using the aforementioned method.

A case where a single RFD is connected is denoted Example 1, and a case where three RFDs are connected is denoted Example 2. The operations of Examples 1 and 2 will now be described.

In Example 1, it is assumed that the single FFD uses a time division multiple access (TDMA) protocol.

Example 1

RFD1 attempts a connection with the FFD to execute an application program for measuring a body temperature. In this example, requirement information of the application program to be executed by RFD1 is listed in the following Table 1.

TABLE 1

| Device | Application/Usage | Sampling Rate | Reliability | Latency |
|---|---|---|---|---|
| RFD1: Temperature Sensor | Measuring Body Temperature | 8 bps | <5% | n/a |

In Table 1, the sampling rate denotes a rate at which data packets are generated, and the reliability denotes a packet loss rate. The reliability and the latency in Table 1 are used as requirement information of the application program.

The FFD may obtain the requirement information of the application program using a variety of methods. For example, when setting up the initial application program in the FFD, it is possible to access a default value of requirement information that is pre-stored in the application program, or to receive requirement information from RFD1 using in-band signaling during an association process in which RFD1 associates with the FFD.

Operation of Analyzer in Example 1

The analyzer maintains and updates information associated with all parameter values used for modeling in a protocol engine. The analyzer obtains requirement information of the application program when an event, for example, an association, associated with the requirement information of the application program has occurred. Also, the analyzer obtains, from a physical (PHY) layer or a MAC layer, a packet error rate, a number of access nodes, and any other information needed to determine an optimal protocol.

The analyzer integrally or selectively transfers the obtained information to the protocol engine. Whether the analyzer transfers the obtained information integrally or selectively may be determined when designing an interface with the protocol engine.

In this example, the analyzer transfers the obtained information to the protocol engine only when there is a change in requirement information of an application program or a number of nodes connected to a protocol reconfiguration apparatus. In this example, when such a change occurs, the analyzer transmits, to the protocol engine, information including a device ID, a reliability requirement, a latency requirement, and the number of nodes connected to the protocol configuration reconfiguration apparatus.

Accordingly, the analyzer of Example 1 transmits requirement information and system information associated with RFD1 to the protocol engine. The requirement information includes, for example, Reliability requirement R=5%, and Latency requirement L=n/a, and the system information includes, for example, Device ID=1 and number of nodes=1.

Operation of Protocol Engine in Example 1

An agent of the protocol engine that receives information from the analyzer triggers a run-time solver using an event-based method that is executed every time information is received, a period-based method of triggering the run-time solver at predetermined intervals, or any other desired method of triggering the run-time solver. As described above, the run-time solver includes a modeling unit to model each of a plurality of protocols, and an algorithm unit to obtain a solution of the model for each of the protocols.

In this example, it will be assumed that the FFD maintains three protocols, an X-MAC protocol, a pure TDMA protocol, and a base protocol.

The base protocol supports only transmitting and receiving of control information for associating RFD1 with the FFD. Accordingly, the modeling unit performs modeling only for the X-MAC protocol and the pure TDMA protocol that are used to transmit data between RFD1 and the FFD.

In the X-MAC protocol, a sender that desires to transmit data to a receiver writes an address of the receiver in a small packet called a strobe packet, and transmits the strobe packet. The receiver awakens from a sleep mode at predetermined intervals, and determines whether there is a strobe packet in which the address of the receiver is written. When there is a strobe packet in which the address of the receiver is written, the receiver transmits an acknowledgement (ACK) packet to the sender. The sender transmits data to the receiver immediately after receiving the ACK packet.

Instead of directly returning to sleep after receiving all of the transmitted data, the receiver stays awake for a predetermined period of time and waits for data from another sender. This operation of the receiver decreases a strobe packet transmission of the other sender and thereby decreases energy.

When the sender detects that the other sender is already transmitting data even though the sender has data to transmit to the receiver, the sender backs off and waits for a predetermined period of time. When the predetermined period of time has elapsed, the sender transmits its data to the receiver. A period of time during which the receiver stays awake after receiving all of the transmitted data from the sender must be at least equal to a maximum back-off time of the sender.

In the pure TDMA protocol, a transmission sequence between the receiver and senders is determined, and data is transmitted in a time slot. The receiver periodically transmits a beacon signal to synchronize the receiver and the senders. The beacon signal includes information that informs the senders which time slot has been assigned to them.

The receiver assigns a single time slot to each of the senders for data transmission, and the senders are allowed to transmit data only in their assigned time slot. The slots assigned for data transmission are referred to active periods. When an active period of a sender ends, the sender enters a sleep mode for a sleep period. The sleep mode is terminated right before a beacon signal transmission time point.

The protocol engine performs mathematical modeling to predict energy consumption and QoS indices, for example, a reliability and a latency, that will occur when performing communication using the X-MAC and the pure TDMA protocols. The modeling unit employs as parameters requirement information of the application program, system parameters, and any other parameter affecting the energy consumption and the QoS indices. The modeling unit understands the operation of the protocols, and formulates each QoS index based on the various parameters.

For example, in the case of the X-MAC protocol, an energy $E_X$ used while generating a packet may be expressed by an energy function $E_X(Rs, Sbo)$ of a sleep period Rs of the receiver and a back-off period Sbo during which a sender needs to wait while another sender is transmitting data. An example of the energy function $E_X(Rs, Sbo)$ may be expressed by the following equation:

$$E_X(Rs,Sbo)=\{(Tmk\_pl/(Tmk\_pl-Td))^\wedge(N-1)*\\(Pon*Son+(Ppll*Spll+Ptx*Sp+Ppll*Spll+\\Prx*Sa)*(Rl+Rs)/(2*(Sp+Sa))+Ppll*Spll+\\Td*Ptx)+(1-(Tmk\_pl/(Tmk\_pl-Td))^\wedge(N-1))*\\(Pon*Son+Ppll*Spll+(Prx*(Sp+Sa)*(Rl+Rs)/(2*\\(Sp+Sa))+Ps*Sbo+Pon*Son+Ppll*Spll+Ptx*Td)+\\Pon*Son+Ppll*Spll+Prx*Rl+Ppll*Spll+Prx*Ra+\\Ppll*Spll+Ptx*Ra+Ppll*Spll+Prx*Rd+Prx*Sbo+\\(Ps*Rs+Pon*Son+Ppll*Spll+Prx*Rl)*(Rl+Rs)/\\(Tmk\_pl/(Rs+Rl)-1)\}/Tmk\_pl$$

Thus, the two parameters Rs and Sbo in the above equation are operating parameters of the X-MAC protocol. The remaining parameters in the above equation are parameters of a radio card used to perform communication using the X-MAC protocol, and may be determined based on a datasheet of the radio card. Specifically, Tmk_pl denotes a payload (packet) occurrence interval, Td denotes a time on air to send a packet, N denotes a number of nodes in the network, Son denotes a start-up time of an oscillator of the radio card, Pon denotes a power used during the start-up time of the oscillator, Ppll denotes a power used while a phase-locked loop (PLL) of the radio card is achieving a lock state, Spll denotes a time used by the phase-locked loop (PLL) to achieve the lock state, Ptx denotes a power used during transmission (TX), Sp denotes a time used by the sender to transmit a strobe (preamble) packet, Prx denotes a power used during reception (RX), Sa denotes a time used by the sender to receive an acknowledgement (ACK) packet, Rl denotes a time the receiver is in an idle state, Ps denotes a power used by the receiver when the receiver is in a sleep state, Ra denotes a time used by the receiver to transmit the acknowledgement packet, and Rd denotes a time used by the receiver to receive a data packet. Accordingly, the remaining parameters are treated as constants for the purpose of calculating the energy Ex as a function of the operating parameters Rs and Sbo.

The reliability R and the latency L that are the requirement information of the application program may also be expressed as reliability and latency functions $R_X(Rs, Sbo)$ and $L_X(Rs, Sbo)$ of the sleep period Rs and the back-off period Sbo. Examples of the reliability and latency functions $R_X(Rs, Sbo)$ and $L_X(Rs, Sbo)$ may be expressed by the following equations:

$$R_X(Rs,Sbo)=(Tmk\_pl/(Tmk\_pl-Td))^\wedge(N-1)+(1-(Tm-\\k\_pl/(Tmk\_pl-Td))^\wedge(N-1))*Z(1-PRidle)\\k*PRidle^\wedge(N-k-1)*(1-1/Sbo)^\wedge(k-1)$$

$$L_X(Rs,Sbo)=(Tmk\_pl/(Tmk\_pl-Td))^\wedge(N-1)*(Son+2*\\(2*Spll+Sp+Sa)*(Rl+Rs)/(Sp+Sa)+Ppll+Sd)+(1-\\(Tmk\_pl/(Tmk\_pl-Td))^\wedge(N-1))*(Son+Spll+2*\\(Sp+Sa)*(Rl+Rs)/(Sp+Sa)+Sbo/2+Pon*Son+\\Ppll*Spll+Td)$$

As discussed above in connection with the equation for the energy function $E_X(Rs, Sbo)$, the two parameters Rs and Sbo in the above equations are the operating parameters of the X-MAC protocol. The remaining parameters in the above equations are parameters of the radio card used to perform communication using the X-MAC protocol, and may be determined based on the datasheet of the radio card. Most of the remaining parameters in the above equations were defined above in connection with the equation for the energy function $E_X(Rs, Sbo)$. Of the remaining parameters that were not defined above, PRidle denotes a probability that a k-th channel is idle, and Sd denotes a time used by the sender to transmit the data packet. Accordingly, the remaining parameters are treated as constants for the purpose of calculating the reliability R and the latency L as functions of the operating parameters Rs and Sbo.

In the case of the TDMA protocol, an energy $E_T$ used while generating a packet may be expressed by an energy function $E_T$(Nframe) of a number of frames Nframe indicating a total number of time slots constituting the active period and the sleep period. An example of the energy function $E_T$(Nframe) may be expressed by the following equation:

$$E_T(\text{Nframe})=Pon*Son+Ppll*Spll+Prx*Tb+Ppll*Spll+\\Ptx*Td+Ppll*Spll+Prx*Tack+Pidle*Tslot*\\(\text{Nframe}-1)/2+Ps*Tslot*(\text{Nframe}-N-1)+\\(Pon*Son+Ppll*Spll+Ptx*Tb+Ppll*Spll+\\Prx*Tslot+Pidle*Tslot*(N-1)/2+Ps*Tslot*\\(\text{Nframe}-N-1)*Tmk\_pl/(Tslot*\text{Nframe})+\\(Pon*Son+Ppll*Spll+Ptx*Tb+Ppll*Spll+\\Prx*Tslot*Nnode+Ps*Tslot*(\text{Nframe}-N-1))*\\Tmk\_pl/(Tslot*\text{Nframe})$$

Thus, the parameter Nframe in the above equation is an operating parameter of the TDMA protocol. The remaining parameters in the above equation are parameters of a radio card used to perform communication using the TDMA protocol, and may be determined based on a datasheet of the radio card. Most of the remaining parameters in the above equation were defined above in connection with the equation for the energy function $E_X(Rs, Sbo)$. Of the remaining parameters that were not defined above, Tb denotes a time used to transmit a beacon, Tack denotes a time used to transmit an acknowledgment (ACK), Pidle denotes a power used while the radio is idle, Tslot denotes a length of a time slot, and Nnode denotes a number of nodes in the network. Accordingly, the remaining parameters are treated as constants for the purpose of calculating the energy $E_T$ as a function of the operating parameter Nframe.

The reliability R and the latency L that are the requirement information of the application program may also be expressed as reliability and latency functions $R_T$(Nframe) and $L_T$(Nframe) of Nframe. Examples of the reliability and latency functions $R_T$(Nframe) and $L_T$(Nframe) may be expressed by the following equations:

$$R_T(\text{Nframe})=1$$

$$L_T(\text{Nframe})=(T\text{slot}*N\text{frame})/2+Td$$

As discussed above in connection with the equation for the energy function $E_T$(Nframe), the parameter Nframe in the above equations are the operating parameters of the TDMA protocol, and the remaining parameters in the above equation are parameters of the radio card used to perform communication using the TDMA protocol, and may be determined based on the datasheet of the radio card. Accordingly, the remaining parameters are treated as constants for the purpose of calculating the reliability R and the latency L as functions of the operating parameter Nframe.

The protocol engine selects an optimal protocol by comparing energy consumptions of the protocol models. The algorithm unit of the protocol engine solves an energy minimization problem for each of the protocols, and selects, as the optimal protocol and the operating parameter for the optimal protocol, a protocol having a minimum energy cost and an operating parameter for the optimal protocol. The algorithm unit is designed to take into account the variable characteristics of the protocols. Based on an assumption that operating parameters of protocols have integer values, the algorithm unit may use a branch and bound algorithm, which is a general algorithm for finding optimal solutions of optimization problems in integer programming.

In this Example 1, as discussed above, the analyzer transmits, to the protocol engine, requirement information including R=5%, and L=n/a, and system information including Device ID=1 and number of nodes=1. The algorithm unit solves the following energy minimization problems:

Minimize $E_X$(Rs, Sbo) so that $$R_X(Rs,Sbo) \geq R=5\%$$

$$L_X(Rs,Sbo) \leq L=n/a$$

Minimize $E_T$(Nframe) so that $$R_T(\text{Nframe}) \geq R=5\%$$

$$L_T(\text{Nframe}) \leq L=n/a$$

The results obtained for X-MAC are optimal Rs=9 ms, optimal Sbo=10 ms, and $E_X$=141.78 mW, and the results obtained for TDMA are optimal NFrame=50 and $E_T$=404.05 mW. Accordingly, since X-MAC has the lowest energy cost of 141.78 mW, the protocol engine selects X-MAC as the optimal protocol, and selects Rs=9 ms and Sbo=10 ms as the operating parameters of the optimal protocol X-MAC.

Operation of Protocol Implementer in Example 1: FFD

The agent of the protocol engine transfers, to the implementer agent of the protocol implementer, information indicating that the optimal protocol is X-MAC and the optimal operating parameters are Rs=9 ms and Sbo=10 ms.

The implementer agent transfers, to the protocol updater, information needed to reconfigure the protocol used by the FFD. The protocol updater transfers information to a reconfigurable protocol stack to implement a reconfigured protocol, and issues a command for executing the reconfigured protocol. In this example, it will be assumed that message hooking is used to reconfigure a protocol.

The protocol updater of the protocol implementer requests a function of adjusting the optimal operating parameters Rs and Sbo of the X-MAC protocol to the optimal values Rs=9 ms and Sbo=10 ms through a function call. Data generated in an application layer is transferred to a lower protocol stack in a form of a message including an ID corresponding to the X-MAC protocol. The protocol updater of the protocol implementer hooks the message before the message is transferred to the lower protocol stack, determines that the optimal protocol is X-MAC based on the ID, and switches to a component module for X-MAC.

Also, the implementer agent enables the reconfigured protocol to be implemented in RFD1. The implementer agent refers to a node state database to determine a protocol currently being used by RFD1. Node state database information for RFD1 is listed in the following Table 2.

TABLE 2

| Device | Protocol in Use | Operating Parameter Value | Available Protocols |
|---|---|---|---|
| RFD1 | TDMA | NFrame = 30 | X-MAC, TDMA |

Since the protocol currently being used in RFD1 is TDMA, the implementer agent determines that a protocol reconfiguration in RFD1 is necessary, and determines whether any component module needed to implement X-MAC in RFD1 is missing from RFD1.

Since the X-MAC protocol is available in RFD1, an operation of transmitting a component module needed to implement X-MAC to RFD1 is not necessary. Accordingly, the implementer agent transmits information (optimal protocol, operating parameter value)=(X-MAC, (9, 10)) (Rs, Sbo) to the reconfigurable protocol stack. The information may be encoded when necessary, and the implementer agent wirelessly transmits the information (encoded or not) to RFD1 using the reconfigurable protocol stack.

Operation of Protocol Implementer in Example 1: RFD

The reconfigurable protocol stack of RFD1 receives the information X-MAC and (9, 10), and transfers the information to the protocol implementer of RFD1. In this example, when the information is encoded, the protocol implementer decodes the information using a protocol parser and transfers the decoded information to the protocol updater. An operation of the protocol updater that receives the information is the same as the operation of the protocol updater of the FFD as described above.

Example 2

Hereinafter, a system operation in a dynamic circumstance where RFD2 and RFD3 request a new connection to the FFD that is already communicating with RFD1 will be described. Generally, the operation in this example is similar to the operation in Example 1, and according the following description will focus on the differences in operation.

Application programs of RFD2 and RFD3 that request the new connection and requirements thereof are listed in the following Table 3.

TABLE 3

| Device | Application/ Usage | Sampling Rate | Reliability | Latency |
|---|---|---|---|---|
| RFD2: ECG Sensor | Measuring Heart Rate | 4 kbps | <1% | <250 ms |

TABLE 3-continued

| Device | Application/Usage | Sampling Rate | Reliability | Latency |
|---|---|---|---|---|
| RFD3: Blood Pressure Sensor | Continuously Measuring Blood Pressure | 0.2 bps | <1% | n/a |

In Example 2, the analyzer transmits, to the protocol engine, requirement information of the application programs of RFD1, RFD2, and RFD3, i.e., the Reliability and Latency requirements listed in Tables 1 and 3, i.e., $R_1$=5%, $L_1$=n/a, $R_2$=1%, $L_2$=250 ms, $R_3$=1%, and $L_3$=n/a, and system information, i.e., the Device IDs=1, 2, 3 and the number of connected sensor nodes=3.

Operation of Protocol Engine in Example 2

In the case of the X-MAC protocol, the protocol engine expresses energy used by RFD1, RFD2, and RFD3 as an energy function $E_X$(Rs, Sbo1, Sbo2, Sbo3) of a sleep period Rs of the FFD operating as the receiver and respective back-off periods Sbo1, Sbo2, and Sbo3 of RD1, RFD2, and RFD3 operating as senders. This energy function is well known to one of ordinary skill in the art, and therefore will not be described here for conciseness. Also, the protocol engine expresses the reliability R and the latency L of RFD1, RFD2, and RFD3 that are the requirement information of the application programs of RFD1, RFD2, and RFD2 as functions $R_{X1}$(Rs, Sbo1, Sbo2, Sbo3), $L_{X1}$(Rs, Sbo1, Sbo2, Sbo3), $R_{X2}$(Rs, Sbo1, Sbo2, Sbo3), $L_{X2}$(Rs, Sbo1, Sbo2, Sbo3), $R_{X3}$(Rs, Sbo1, Sbo2, Sbo3), and $L_{X3}$(Rs, Sbo1, Sbo2, Sbo3). These functions are well known to one of ordinary skill in the art, and therefore will not be described in detail herein for conciseness.

In the case of the TDMA protocol, the protocol engine expresses energy used by RFD1, RFD2, and RFD3 as an energy function ET(Nframe) of Nframe, which is a parameter of the FFD operating as the receiver, which is the same function as in Example 1. This energy function is well known to one of ordinary skill in the art, and therefore will not be described in detail herein for conciseness. The protocol engine also expresses the reliability R and the latency L that are the requirement information of the application programs of RFD1, RFD2, and RFD3 as functions $R_{T1}$(Nframe), $L_{T1}$(Nframe), $R_{T2}$(Nframe), $L_{T2}$(Nframe), $R_{T3}$(Nframe), and $L_{T3}$(Nframe) of Nframe. These functions are well known to one of ordinary skill in the art, and therefore will not be described in detail herein for conciseness.

In this Example 2, as discussed above, the analyzer transmits, to the protocol engine, the requirement information, i.e., $R_1$=5%, $L_1$=n/a, $R_2$=1%, $L_2$=250 ms, $R_3$=1%, and $L_3$=n/a, and the system information, i.e., the Device IDs=1, 2, 3 and the number of connected sensor nodes=3. The algorithm unit solves the following energy minimization problems in this Example 2 using the same method discussed above in connection with Example 1

Minimize $E_X$(Rs, Sbo1, Sbo2, Sbo3) so that $R_{X1}(Rs,Sbo1,Sbo2,Sbo3) \geq R=5\%$ $L_{X1}(Rs,Sbo1,Sbo2,Sbo3) \leq L=n/a$ $R_{X2}(Rs,Sbo1,Sbo2,Sbo3) \geq R=1\%$ $L_{X2}(Rs,Sbo1,Sbo2,Sbo3) \leq L=250$ ms $R_{X3}(Rs,Sbo1,Sbo2,Sbo3) \geq R=1\%$ $L_{X3}(Rs,Sbo1,Sbo2,Sbo3) \leq L=n/a$ Minimize $E_T$(Nframe) so that $R_{T2}(Nframe) \geq R=5\%$ $L_{T1}(Nframe) \leq L=n/a$ $R_{T2}(Nframe) \geq R=1\%$ $L_{T2}(Nframe) \leq L=250$ ms $R_{T3}(Nframe) \geq R=1\%$ $L_{T3}(Nframe) \leq L=n/a$ The results obtained for X-MAC are optimal Rs=1 ms, optimal Sbo1=10 ms, optimal Sbo2=25 ms, optimal Sbo3=25 ms, and $E_X$=803.81 mW, and the results obtained for TDMA are optimal NFrame=20 and $E_T$=456.92 mW. Accordingly, since TDMA has the lowest energy cost of 456.92 mW, the protocol engine selects TDMA as the optimal protocol, and selects Nframe=20 as the operating parameter of the optimal protocol TDMA.

Operation of Protocol Implementer in Example 2: FFD

The agent of the protocol engine transfers, to the implementer agent of the protocol implementer, information indicating that the optimal protocol is TDMA and the optimal operating parameter is Nframe=20.

The implementer agent transfers, to the protocol updater, information needed to reconfigure the protocol used by the FFD. The protocol updater transfers information to a reconfigurable protocol stack to implement a reconfigured protocol, and issues a command for executing the reconfigured protocol. A detailed description is the same as Example 1.

The implementer agent enables the reconfigured protocol to be implemented in RFD1, RFD2, and RFD3 that are connected to the FFD. The implementer agent refers to the node state database to determine which protocols are being currently used by RFD1, RFD2, and RFD3. Node state database information for RFD1, RFD2, and RFD3 is listed in the following Table 4.

TABLE 4

| Device | Protocol in Use | Operating Parameter Values | Available Protocols |
|---|---|---|---|
| RFD1 | X-MAC | Rs = 9, Sbo = 10 | X-MAC, TDMA |
| RFD2 | Base Protocol | | X-MAC, TDMA |
| RFD3 | Base Protocol | | X-MAC |

Referring to Table 4, the implementer agent transmits information (optimal protocol, operating parameter value)= (TDMA, 30) to RFD1 and RFD2 in which the TDMA protocol is available to RFD1 and RFD2 using the reconfigurable protocol stack. When information provided by a user indicates that encoding is to be performed, the implementer agent encodes the information and transmits the encoded information to RFD1 and RFD2 using the reconfigurable protocol stack.

The TDMA protocol is not available in RFD3, so the implementer agent identifies any component module needed to implement the TDMA protocol that is missing from RFD2 by referring to a component library. For example, when a number 3 component module needed to implement the TDMA protocol is missing from RFD3, the implementer agent transmits the number 3 component module to RFD3 together with the information (optimal protocol, operating parameter value)=(TDMA, 30) using the reconfigurable protocol stack. In this example, the number 3 component module is in an ELF format.

Operation of Protocol Implementer in Example 2: RFD

The protocol stack of RFD3 receives the information (optimal protocol, operating parameter value)=(TDMA, 30) and the number 3 component module, and transfers the information and the number 3 component module to the protocol implementer of RFD3. In this example, when the information and the number 3 component module are encoded, the protocol implementer of RFD3 decodes the information and the number 3 component module using the protocol parser. The protocol updater of RFD3 transmits, to a linker, a message to link the number 3 component module. The linker configures a TDMA stack by linking a new ELF object and loading a binary to a code memory. The protocol updater of RFD3 configures the TDMA protocol using the information (optimal protocol, operating parameter value)=(TDMA, 30) using the same method as in Example 1.

By reusing at least one component module among a plurality of component modules to implement a reconfigured protocol as described above, it is possible to reconfigure in real time a protocol capable of providing a QoS required by an application program, decrease memory use in a sensor device, and decrease a protocol implementation time required for an application program.

The various analyzers, protocol engines, protocol implementers, reconfigurable protocol stacks, agents, run-time solvers, modeling units, algorithm units, protocol databases, databases, implementer agents, protocol updaters, component libraries, node state databases, protocol parsers, protocol encoders, configuration tables in FIGS. 1, 2, 5-9, 11, and 12 described above and the various elements in FIG. 13 may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, radio transmitters, radio receivers, sensors, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of reconfiguring a protocol used by sensor applications of a plurality of sensor nodes, the method comprising:
    obtaining requirement information of the sensor applications,
        wherein the requirement information of the sensor applications comprises a latency (L1) required by a first sensor application, a reliability (R1) required by the first sensor application, a latency (L2) required by a second sensor application, and a reliability (R2) required by the second sensor application;
    analyzing the requirement information of the sensor applications by using an energy function (E1) for a first protocol, latency functions (L11) and (L12) for the first protocol respectively of a first sensor node and second sensor node, reliability functions (R11) and (R12) for the first protocol respectively of the first sensor node and the second sensor node, an energy function (E2) for a second protocol, and latency functions (L21) and (L22) for the second protocol respectively of the first sensor node and the second sensor node, and reliability functions (R21) and (R22) for the second protocol respectively of the first sensor node and the second sensor node,
        wherein each of (E1), (L11), (L12), (R11) and (R12) is mathematically modeled based on a first operating parameter of the first protocol, and each of (E2), (L21), (L22), (R21) and (R22) is mathematically modeled based on a second operating parameter of the second protocol, in which (L11), (R11), (L21) and (R21) correspond to the first sensor application, and (L12), (R12), (L22) and (R22) correspond to the second sensor application; and
        wherein the analyzing of the requirement information of the sensor applications comprises calculating first minimum energy for the first protocol based on (E1), in which (L11) is less than or equal to (L1), (L12) is less than or equal to (L2), (R11) is greater than or equal to (R1), and (R12) is greater than or equal to (R2), and
    calculating second minimum energy for the second protocol based on (E2), in which (L21) is less than or equal to (L1), (L22) is less than or equal to (L2), (R21) is greater than or equal to (R1), and (R22) is greater than or equal to (R2);
    determining protocol configuration information comprising a reconfigured protocol used by the sensor applications and an operating parameter of the reconfigured protocol based on a result of the analyzing;
    determining, based on the protocol configuration information, a connection relationship of a component module, among component modules, to implement the reconfigured protocol;
    selecting, from the first protocol and the second protocol, the reconfigured protocol having a lesser minimum energy; and
    implementing the reconfigured protocol.

2. The method of claim 1, wherein the obtaining of the requirement information is based on whether an event associated with the requirement information has occurred.

3. The method of claim 1, wherein the determining of the protocol configuration information comprises defining a quality of service (QoS) index of each of protocols and a QoS index corresponding to each item of the requirement information of the application programs as functions of an operating parameter of the protocol and a parameter obtainable from a protocol layer.

4. The method of claim 1, wherein the determining of the protocol configuration information comprises determining the operating parameter to optimize a quality of service (QoS) index of the reconfigured protocol while satisfying requirements of the application program indicated by the requirement information of the application programs.

5. The method of claim 1, further comprising maintaining a protocol database that stores protocols and respective operating parameters of the protocols mapped to the requirement information by applying information comprising a result of the analyzing to each of the protocols;
    wherein the determining of the protocol configuration information comprises referring to the protocol database to determine, as the reconfigured protocol and the operating parameter of the reconfigured protocol, one of the protocols and the operating parameter of the one protocol that are mapped to the requirement information of the application programs.

6. The method of claim 1, further comprising maintaining a component library that stores information associated with the component modules.

7. The method of claim 6, further comprising:
    determining whether a target device in which the reconfigured protocol is to be implemented is missing any component module to implement the reconfigured protocol; and
    obtaining, from the component library, information associated with any component module determined to be missing from the target device.

8. The method of claim 1, further comprising maintaining a node state database that stores information associated with a protocol and an operating parameter and of the protocol being used by a target device.

9. The method of claim 1, further comprising encoding the information to implement the reconfigured protocol in the target device.

10. The method of claim 1, wherein the determining of the connection relationship comprises:
receiving the protocol configuration information; and
parsing the protocol configuration information.

11. The method of claim 1, further comprising connecting the component module using a table comprising an address of each component module.

12. The method of claim 1, wherein the determining of the connection relationship comprises:
hooking a message passing to a lower layer of an application layer according to the reconfigured protocol used by the application program; and
switching to the component module based on an identifier (ID) of a protocol obtained from the hooked message.

13. A non-transitory computer-readable storage medium comprising a program for instructing a computer to perform the method of claim 1.

14. An apparatus for reconfiguring a protocol used by an application program, the apparatus comprising:
an analyzer implemented by a processor and configured to obtain requirement information of application programs and to analyze the requirement information of the application programs;
a protocol engine implemented by the processor and configured to determine protocol configuration information comprising a reconfigured protocol used by the application programs and an operating parameter of the reconfigured protocol based on an analysis result obtained by the analyzer;
a protocol implementer implemented by the processor and configured to determine, based on the protocol information, a connection relationship of a component module, among component modules, to implement the reconfigured protocol; and
a reconfigurable protocol stack comprising a memory configured to store component modules,
wherein
in order to reconfigure the protocol in an active mode, the determining of the connection relationship comprises
generating information associated with the connection relationship based on the protocol configuration information, and
implementing the reconfigured protocol using the information associated with the connection relationship; and
in order to realize the reconfigured protocol in a passive mode, the determining of the connection relationship comprises
generating information to implement the reconfigured protocol in a target device based on the protocol configuration information by referring to a node state database configured to store a list of protocols currently available to the target device and an operating parameter of a protocol currently implemented by the target device, and by referring to the connection relationship, and
transmitting, to the target device, the information to implement the reconfigured protocol in the target device.

15. A method of reconfiguring a protocol used by an application program of application programs, the method comprising:
determining whether an optimal protocol used by the application programs is the optimal protocol;
determining, upon requirement information of the application program changing, an optimal value of an operating parameter of the optimal protocol based on the changed requirement information of the application programs and system information obtained from a protocol layer,
wherein the requirement information comprises latency information and reliability information; and
in response to a current protocol of the application programs not being the optimal protocol, reconfiguring the current protocol used by the application program to be the optimal protocol using a component module missing from the current protocol used by the application program and a component module of the current protocol used by the application program, and setting a value of the operating parameter of the optimal protocol to be an optimal value of the optimal protocol according to which the current protocol is reconfigured as the optimal protocol,
wherein the determining of the optimal value of the operating parameter comprises
determining the optimal value of the operating parameter based on an energy function of the operating parameter, such that the energy function is minimized based on the latency information and the reliability information.

16. The method of claim 15, wherein the component module missing from the current protocol used by the application program and the component module of the current protocol used by the application program are included in component modules stored in a memory of a reconfigurable protocol stack.

17. The method of claim 15, further comprising, when the current protocol used by the application program is the optimal protocol and a current value of the operating parameter of the optimal protocol is not the optimal value, setting the value of the operating parameter to be the optimal value.

18. The method of claim 15, wherein the application program is running on a first device to process data transmitted to the first device using the current protocol from a second device connected to the first device; and
the determining of the optimal protocol is also performed when a third device connects to the first device.

19. A non-transitory computer-readable medium storing instructions that, when executed by a processor, cause the processor to perform the method of claim 1.

20. A non-transitory computer-readable medium storing instructions that, when executed by a processor, cause the processor to perform the method of claim 15.

* * * * *